(12) United States Patent  
Hatakeyama et al.

(10) Patent No.: US 9,140,903 B2  
(45) Date of Patent: Sep. 22, 2015

(54) VEHICLE INFORMATION TRANSMITTING DEVICE

(75) Inventors: Yoshiyuki Hatakeyama, Fuji (JP); Shinya Kawamata, Gotenba (JP); Osamu Ozaki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 13/992,431

(22) PCT Filed: Apr. 18, 2011

(86) PCT No.: PCT/JP2011/059548  
§ 371 (c)(1),  
(2), (4) Date: Jun. 7, 2013

(87) PCT Pub. No.: WO2012/077367  
PCT Pub. Date: Jun. 14, 2012

(65) Prior Publication Data  
US 2013/0258488 A1 Oct. 3, 2013

(30) Foreign Application Priority Data  
Dec. 8, 2010 (JP) .................................. 2010-273882

(51) Int. Cl.  
*G02B 27/01* (2006.01)  
*B60K 35/00* (2006.01)  
*B60K 37/02* (2006.01)

(52) U.S. Cl.  
CPC ............ *G02B 27/0101* (2013.01); *B60K 35/00* (2013.01); *B60K 37/02* (2013.01); *B60K 2350/2052* (2013.01)

(58) Field of Classification Search  
USPC ............................................................ 359/630  
See application file for complete search history.

(56) References Cited

U.S. PATENT DOCUMENTS 6,720,938 B2 * 4/2004 Ohkawara et al. ................ 345/7  
2002/0171739 A1 11/2002 Yamada  
2009/0189753 A1 7/2009 Enya et al.

(Continued)

FOREIGN PATENT DOCUMENTS

JP    A-07-061257    3/1995  
JP    2002-344958 A  11/2002

(Continued)

OTHER PUBLICATIONS

Translation of foreign patent JP2006327310 (A) Funekawa.*

*Primary Examiner* — Jordan Schwartz  
*Assistant Examiner* — George G King  
(74) *Attorney, Agent, or Firm* — Oliff PLC

(57) ABSTRACT

To provide a vehicle information transmitting device capable of resolving the bothersome that occurs when the light is strong. According to the present embodiment, a plurality of light sources 10a is arranged in an array form of plural rows or plural columns in the light source panel 10 so that light can be irradiated in a horizontal direction (right and left direction) and vertical direction (height direction, up and down direction). The light source panel 10 includes a diffusion plate 10b and a shaft member 10c for entirely or partially adjusting the transmitting degree (blurring degree of light) of the light of the light source 10a in association with the arrangement position of the light source 10a, and a plurality of springs 10d that plays the role of a fail safe for maintaining the distance between the light source 10a and the diffusion plate 10b in a maximum state at the time of malfunctioning.

14 Claims, 21 Drawing Sheets

(56) References Cited

U.S. PATENT DOCUMENTS

2009/0231116 A1 9/2009 Takahashi et al.
2010/0254019 A1* 10/2010 Cui et al. .................. 359/633

FOREIGN PATENT DOCUMENTS

| | | |
|---|---|---|
| JP | 2003-054334 A | 2/2003 |
| JP | B2-3626229 | 3/2005 |
| JP | A-2005-135037 | 5/2005 |
| JP | 2006-264507 A | 10/2006 |
| JP | 2006327310 A * | 12/2006 ............ B60K 35/00 |
| JP | A-2006-327310 | 12/2006 |
| JP | 2009-196630 A | 9/2009 |
| JP | 2009-217682 A | 9/2009 |
| JP | A-2010-071838 | 4/2010 |
| JP | 2010-120501 A | 6/2010 |
| JP | A-2010-167830 | 8/2010 |
| JP | A-2010-176591 | 8/2010 |

* cited by examiner

| L | COLOR | LUMINANCE |
|---|---|---|
| CLOSE | DEEP | DARK |
| INTERMEDIATE | REFERENCE VALUE | REFERENCE VALUE |
| FAR | LIGHT | BRIGHT |

| θ | COLOR | LUMINANCE |
|---|---|---|
| LARGE | DEEP | DARK |
| INTERMEDIATE | REFERENCE VALUE | REFERENCE VALUE |
| SMALL | LIGHT | BRIGHT |

| VEHICLE BODY COLOR | REGULAR-TIME COLOR | ATTENTION ATTRACING COLOR | WARNING COLOR | LUMINANCE |
|---|---|---|---|---|
| WHITE TYPE | GREEN | ORANGE | RED | HIGH LUMINANCE |
| BLACK TYPE | GREEN | ORANGE | RED | LOW LUMINANCE |
| RED TYPE | LIGHT BLUE | GREEN | YELLOW | MEDIUM LUMINANCE |
| BLUE TYPE | GREEN | YELLOW | RED | MEDIUM LUMINANCE |
| YELLOW TYPE | BLUE | PINK | RED | MEDIUM LUMINANCE |

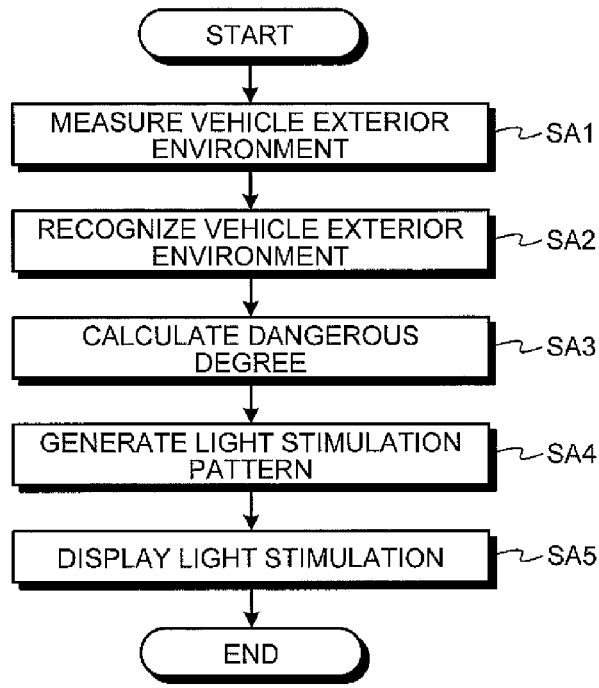

FIG.32

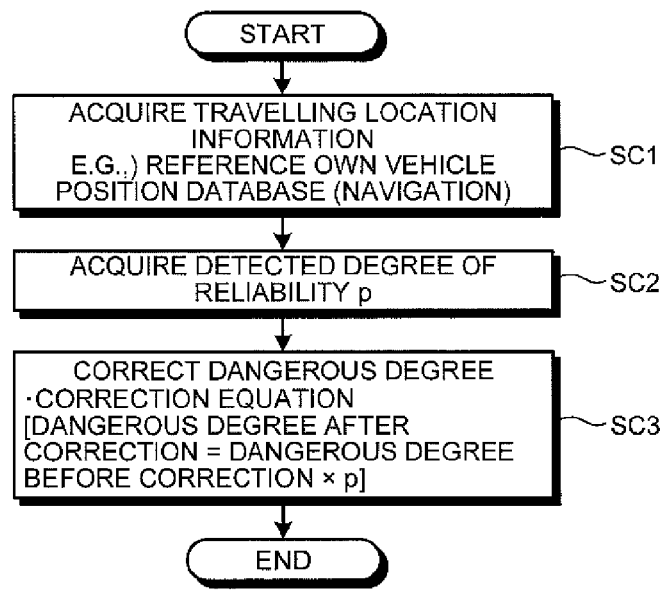

FIG.33

DETECTED DEGREE OF RELIABILITY DATABASE

| TRAVELLING LOCATION | | OBJECT TO BE DETECTED | DEGREE OF RELIABILITY p |
|---|---|---|---|
| URBAN AREAS | GENERAL ROADS | PERSON | 0.6 |
| | | BICYCLE | 0.6 |
| | | AUTOMOBILE | 0.7 |
| | EXPRESS WAYS | AUTOMOBILE | 0.7 |
| | | BIG SIZE VEHICLE | 0.8 |
| | | MOTORCYCLE | 0.7 |
| SUBURBS | GENERAL ROADS | PERSON | 0.7 |
| | | BICYCLE | 0.7 |
| | | AUTOMOBILE | 0.7 |
| | EXPRESS WAYS | AUTOMOBILE | 0.7 |
| | | BIG SIZE VEHICLE | 0.8 |
| MOUNTAINS | GENERAL ROADS | PERSON | 0.8 |
| | | BICYCLE | 0.9 |
| | | AUTOMOBILE | 0.9 |
| | | MOTORCYCLE | 0.9 |

CORRECTION COEFFICIENT DATABASE

| DOWNWARD SLOPE ANGLE a (DEGREE) | CORRECTION COEFFICIENT b |
|---|---|
| 0 < a ≤ 5 | 1.3 |
| 5 < a ≤ 10 | 1.6 |
| 10 < a | 2.0 |

FIG.38

| RIGHT AND LEFT RATIO OF DANGEROUS DEGREE DISTRIBUTIONS | DISPLAY EXAMPLE |
|---|---|
| 9:1 | A1 — 81 DEGREES, 9 DEGREES — A2<br>LEFT    RIGHT |
| 7:3 | B1 — 63 DEGREES, 27 DEGREES — B2<br>LEFT    RIGHT |
| 5:5 | C1 — 45 DEGREES, 45 DEGREES — C2<br>LEFT    RIGHT |

VEHICLE INFORMATION TRANSMITTING DEVICE

FIELD

The present invention relates to a vehicle information transmitting device.

BACKGROUND

Patent Literature 1 discloses a vehicle displaying device that reflects the light of an LED on a front window glass to transmit the information to a driver. Patent Literature 2 discloses a vehicle drive supporting system that notifies a driver of danger by irradiating light of a light source installed in the vehicle to a position on a front glass surface corresponding to the detected position of danger at the exterior of the vehicle as the light reflecting on the background of the front glass.

Other conventional art literatures include patent Literatures 3 to 5. Patent Literature 3 discloses a vehicle head-up displaying device that irradiates the light of the LED on the front window through a diffusion plate. Patent Literature 4 discloses a vehicle displaying device that lowers the alarm level of an alarm when a driver confirms the alarm displayed on the window shield. Patent Literature 5 discloses a vehicle information presenting device that switches the display of the information to lower visual inducing property when the driver confirms the displayed information.

CITATION LIST

Patent Literature

Patent Literature 1: Japanese Patent Application Laid-open No. 2010-176591
Patent Literature 2: Japanese Patent No. 3626229
Patent Literature 3: Japanese Patent Application Laid-open No. 2010-167830
Patent Literature 4: Japanese Patent Application Laid-open No. H07-61257
Patent Literature 5: Japanese Patent Application Laid-open No. 2005-135037

SUMMARY

Technical Problem

However, according to patent Literatures 1 and 2, there is a problem in that the light is sometimes strong and bothersome.

In light of the foregoing, it is an object of the present invention to provide a vehicle information transmitting device capable of resolving the bothersome that occurs when the light is strong.

Solution to Problem

The present invention relates to a vehicle information transmitting device that transmits information by irradiating light on a vehicle body, the vehicle information transmitting device including an adjusting means that is configured to adjust diffusiveness of the light. The adjusting means may strengthen (increase/raise) the diffusiveness when prompting to confirm a certain position or direction, and weaken (reduce/lower) the diffusiveness when transmitting specific information. The adjusting means adjusts the diffusiveness according to a vehicle speed when transmitting the specific information. The adjusting means may selectively strengthen (increase/raise) the diffusiveness only for the light recognized by a driver of the light irradiated on the vehicle body. The adjusting means may adjust the diffusiveness according to the quality of the transmitted information. The adjusting means may adjust the diffusiveness based on a dangerous degree. The adjusting means may adjust a luminance of the light according to a distance from a peripheral edge portion to a center portion of the light based on the dangerous degree. The adjusting means may make a changing amount of the luminance from the peripheral edge portion to the center portion of the light when the dangerous degree is high to be greater than the changing amount of the luminance from the peripheral edge portion to the center portion of the light when the dangerous degree is low.

Advantageous Effects of Invention

The present invention has an effect of resolving the bothersome virtual image that occurs when the light is strong since the adjusting means that adjusts the diffusiveness of the light is arranged.

BRIEF DESCRIPTION OF DRAWINGS

FIG. 11 is a view illustrating one example of an adjusting method of color and luminance of light of a light source 10a.
FIG. 12 is a view illustrating one example of a map defining a relationship between a distance L and the color/luminance, and a map defining a relationship between an angle θ and the color/luminance.

FIG. 21 is a flowchart illustrating an example of a risk calculating operation and a lighting control operation executed by the vehicle information transmitting system according to the present embodiment.

FIG. 22 is a view illustrating an example of a map defining a relationship of a position of an object and a degree of danger, and an irradiation position and an irradiation area of the light.

FIG. 32 is a flowchart illustrating one example of a dangerous degree correcting operation based on a degree of reliability executed by the vehicle information transmitting system according to the present embodiment.

FIG. 33 is a view illustrating one example of a detection degree of reliability database defining a relationship among a travelling location, a detection object, and a degree of reliability.

FIG. 38 is a view illustrating one example of a method for changing a figure shape of the light stimulation according to the dangerous degree.

DESCRIPTION OF EMBODIMENTS

An embodiment of a vehicle information transmitting system including a vehicle information transmitting device according to the present invention will be hereinafter described in detail based on the drawings. The present invention is not limited by such embodiment.

The vehicle information transmitting system according to the present embodiment is a system that irradiates a front window glass with light of a plurality of light sources (LED: light-emitting diode) mounted (arrayed) in an array form (plural rows or plural columns) on an installment panel to notify (attract attention or warn) the driver of an existing position or an existing direction of a dangerous object (e.g., pedestrian, bicycle, automobile, blind angle, etc.) at both peripheries of the own vehicle with a virtual image from the light. One example of the configuration of such system, the operation executed by such system, and the like will be hereinafter described in detail with reference to the drawings.

Hereinafter, a mounting position of the light source will be described mainly as the installment panel, but may be a meter panel, for example. Furthermore, the light source will be described mainly as a single-color LED, but may be a full color LED, a valve, or the like, for example. The irradiating destination of the light (displaying destination of the virtual image) will be described mainly as the front window glass, but may be an A-pillar, a side mirror, a meter panel, an installment panel, or the like, for example. The content to notify to the driver will be described mainly as a dangerous object (risk), but may be routing assistance, mail reception, state and condition of the driver (e.g., awake, sleeping, etc.), state of the own vehicle (e.g., state of economical driving, etc.), and the like, for example. A means for detecting the dangerous object will be described as an object sensor, but may be image recognition by camera, communication such as vehicle-vehicle communication or road-vehicle communication, navigation information (e.g., map and database associated with a dangerous place), and the like, for example. The position and direction of prompting the notification will be described mainly as right and left when seen from the driver, but may be front and back when seen from the driver, for example. The displaying shape of the virtual image will be described mainly as a linear shape (dot sequence), but may be a figure such as an icon, character, symbol, or the like, for example. Other than notifying the existing position or the existing direction of the dangerous object, the content of the dangerous object (e.g., dangerous object is pedestrian, bicycle, automobile, blind angle, etc.) may be notified. The mode of notification (form of notification, manner of notification) will be described mainly as light, but merely needs to be a mode that can be recognized by humans such as sound (voice) or operation reaction force, and the like, for example.

[1. Configuration]

Figure 1:
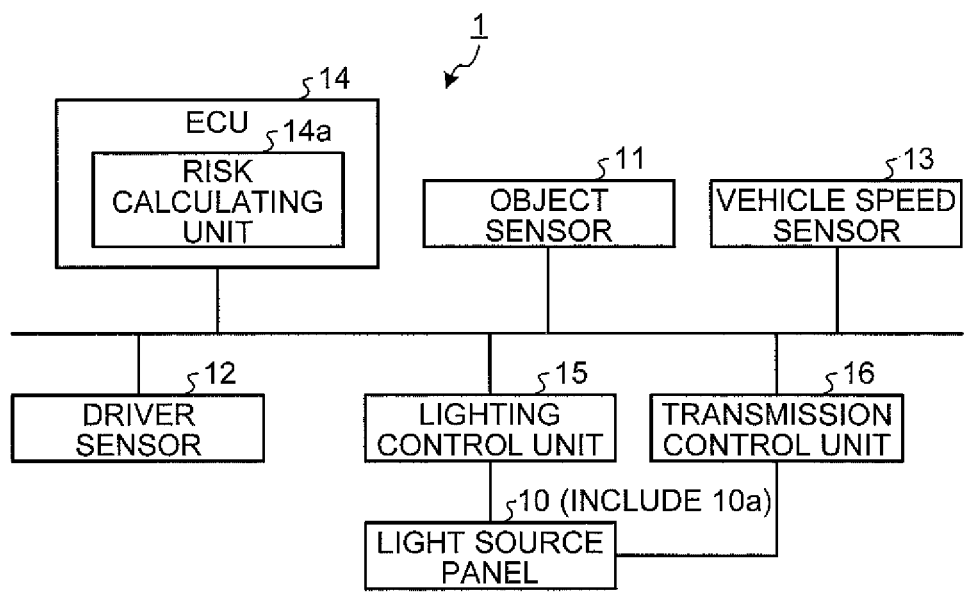
FIG. 1 is a block diagram illustrating one example of a configuration of a vehicle information transmitting system according to a present embodiment.

FIG. 1 is a block diagram illustrating one example of a configuration of a vehicle information transmitting system according to the present embodiment. A vehicle 1 includes a light source panel 10 having a plurality of light sources 10a and a mechanism for adjusting the transmitting extent of the light (specifically, luminance of light) of the light sources 10a, an object sensor 11, a driver sensor 12, a vehicle speed sensor 13, an ECU (electronic control unit) 14 having a risk calculating unit 14a, a lighting control unit 15, and a transmission control unit 16.

The object sensor 11 detects a vehicle exterior environment at the periphery of the vehicle 1 (e.g., objects such as pedestrian, bicycle, automobile, blind angle (e.g., behind a building, far side of curve, far end of vehicle etc.), information associated with a road shape such as linear, left curve, and right curve). The driver sensor 12 detects an observing point or an observing direction of the driver. The vehicle speed sensor 13 detects the vehicle speed of the vehicle 1. The risk calculating unit 14a calculates (estimates) the degree of danger (risk) at the periphery of the vehicle 1 based on the vehicle exterior environment at the periphery of the vehicle 1 detected by the object sensor 11, the observing point or observing direction detected by the driver sensor 12, the vehicle speed detected by the vehicle speed sensor 13, and the like.

Figure 2:
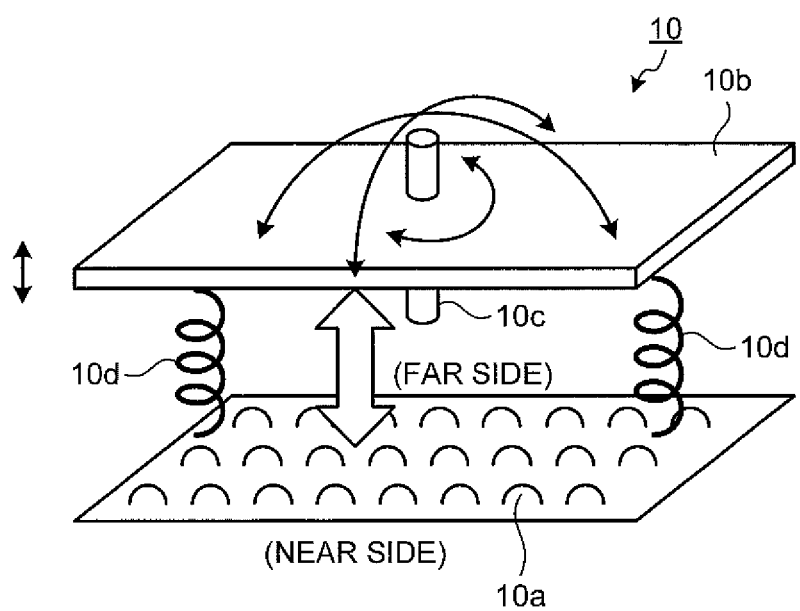
FIG. 2 is a view illustrating one example of a configuration of a light source panel 10.

FIG. 2 is a view illustrating one example of a configuration of the light source panel 10. In FIG. 2, reference sign 10b is assigned to a diffusion plate, reference sign 10c to a shaft member, and reference sign 10d to a spring. In the light source panel 10, the plurality of light sources 10a are arranged in an array form of plural columns or plural rows so that light can be irradiated in the horizontal direction (right and left direction) and the vertical direction (height direction, up and down direction). In order to have a virtual image in three horizontal columns of red, yellow, and green to appear in order from the top on the front window glass, the light source 10a that emits a red light is arranged in the column on the near side when seen from the driver when the light source panel 10 is installed, the light source 10a that emits an yellow light is arranged in the middle column, and the light source 10a that emits a green light is arranged in the column on the far side. The light source panel 10 includes the diffusion plate 10b and the shaft member 10c for entirely or partially adjusting the transmitting extent of the light of the light source 10a (blurring extent of light/diffuseness of light) in association with the position of the light source 10a, and a plurality of springs 10d that plays the role of a fail safe for maintaining the distance between the light source 10a and the diffusion plate 10b in a maximum state at the time of malfunction. The light source panel 10 is also arranged with a power device (not illustrated) such as a motor that electromagnetically or electrically achieves three rotational movements (movements in up and down direction, right and left direction, twisting direction) of pitch, yaw, and roll of the diffusion plate 10b. The diffusion plate 10b is a thin plate-like member made from a material such as polypropylene or polycarbonate. The shaft member 10c is a rod-like member that serves as a shaft of the three rotational movements of the diffusion plate 10b. The position or the number of springs 10d may be the position or the number that can maintain the distance between the light source 10a and the diffusion plate 10b in a maximum state at the time of malfunction. A Fresnel lens may be inserted above or below the diffusion plate 10b to enlarge the light to a wider range.

Figure 3:
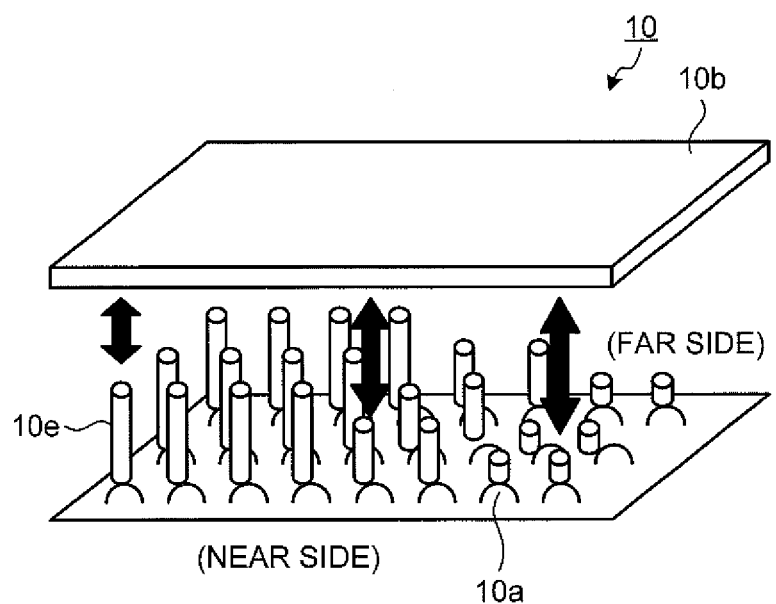
FIG. 3 is a view illustrating one example of the configuration of the light source panel 10.

FIG. 3 is a view illustrating another example of the configuration of the light source panel 10. In FIG. 3, reference sign 10e is assigned to a light guiding member. The light source panel 10 is arranged with the diffusion plate 10b and the light guiding member 10e for adjusting the transmitting extent of the light of the light source 10a. The light guiding member 10e is an optical fiber, for example, and is arranged with respect to the individual light source 10a as illustrated in the figure. The light source panel 10 is arranged with a power device (not illustrated) for achieving the adjustment of the distance between the diffusion plate 10b and the light guiding member 10e. The transmitting extent of the light can be adjusted independently for each light source 10a by adopting the configuration illustrated in FIG. 3.

Figure 4:
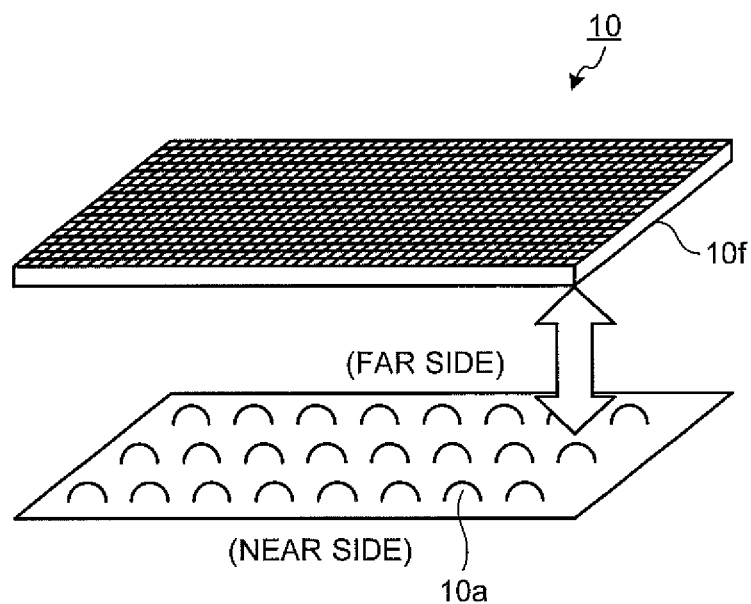
FIG. 4 is a view illustrating one example of the configuration of the light source panel 10.

FIG. 4 is a view illustrating another example of the configuration of the light source panel 10. In FIG. 4, reference sign 10f is assigned to a liquid crystal panel. The light source panel 10 is arranged with the liquid crystal panel 10f for adjusting the transmitting extent of the light of the light source 10a in a state that the distance with the light source 10a is fixed. An aperture ratio of the liquid crystal panel 10f reduces from the center towards the periphery to gradate the light by adopting the configuration illustrated in FIG. 4.

Figure 5:
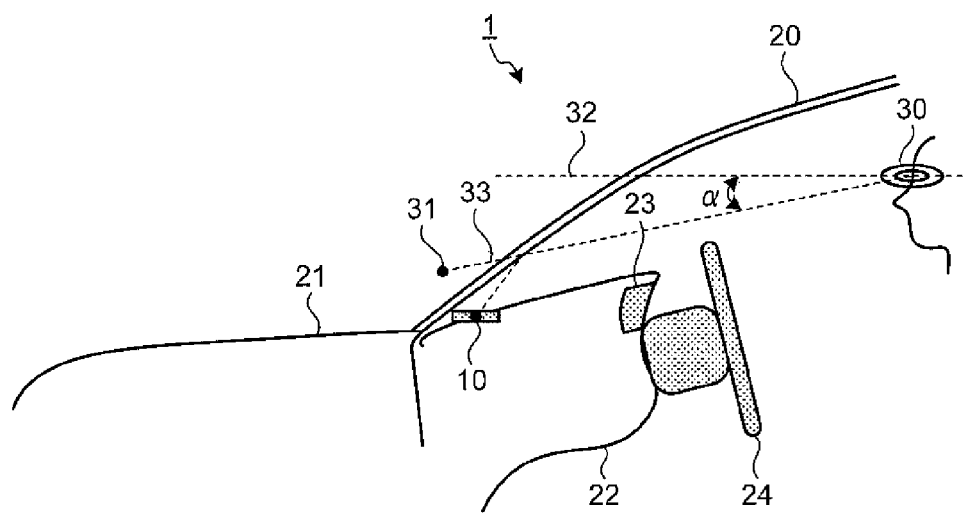
FIG. 5 is a view illustrating one example of a mounting position of the light source panel 10.
Figure 6:
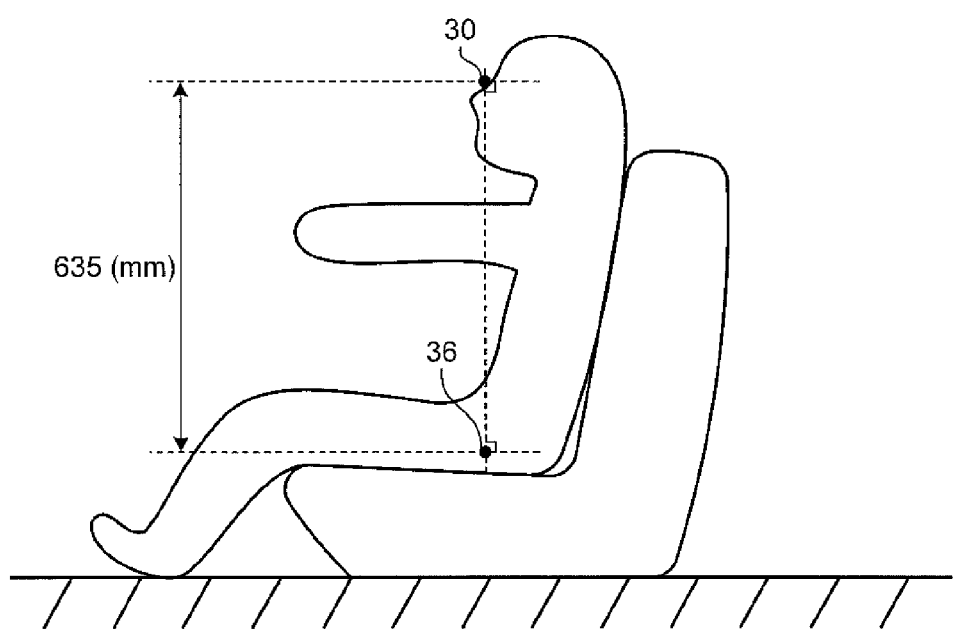
FIG. 6 is a view illustrating one example of a definition of an eye point 30.

FIG. 5 is a view illustrating an example of a mounting position of the light source panel 10 in the vehicle 1. In FIG. 5, reference sign 20 is assigned to a front window glass having a double reflection suppressing structure such as a tempered glass, for example, reference sign 21 to a bonnet, reference sign 22 to an installment panel, reference sign 23 to a meter panel, reference sign 24 to a steering wheel, reference sign 30 to an eye point of the driver, reference sign 31 to a virtual image by the light from the light source panel 10, reference sign 32 to a horizontal line passing the eye point 30, and reference sign 33 to an optical path of the light from the light source panel 10. The light source panel 10 is installed on the installment panel 22, but in particular, is installed at a position where the virtual image 31 can be recognized by the driver at a lowermost layer of the peripheral field of the driver (e.g., depression angle $\alpha$ from the horizontal line 32 passing the eye point 30 is smaller than or equal to five degrees). For example, the light source panel 10 is installed at a position on the front window glass 20 side than the meter panel 23 (i.e., far side of the installment panel 22 when seen from the eye point 30). As illustrated in FIG. 6, the eye point 30 is a point of a height of 635 (mm) to the upper side in the vertical direction of a seating reference point 36, which is a hip joint point of a human phantom, when the human phantom is seated on a seat, based on ISO 6549-1980 (see "Notice defining items of safety standard of road trucking vehicle [2005.11.09] Annex 81 (Technical standard for front under mirror) disclosed in the ISO homepage address.

Figure 7:
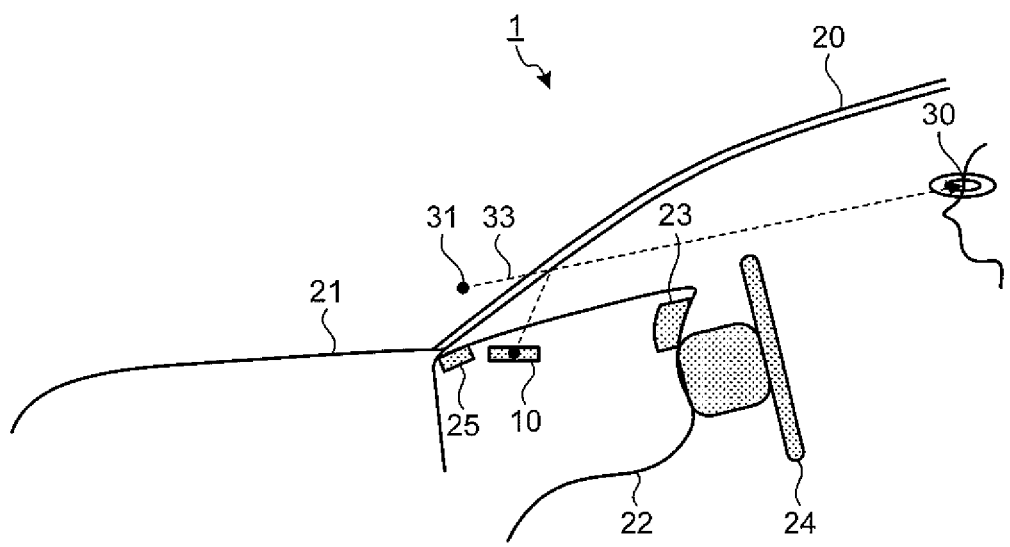
FIG. 7 is a view illustrating one example of the mounting position of the light source panel 10.
Figure 8:
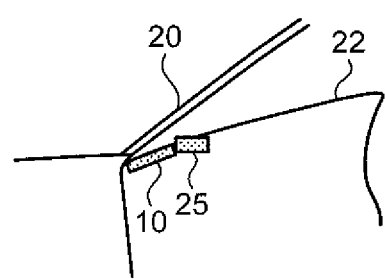
FIG. 8 is a view illustrating one example of the mounting position of the light source panel 10.

FIG. 7 and FIG. 8 are views illustrating another example of the mounting position of the light source panel 10 in the vehicle 1. In FIG. 7 and FIG. 8, reference sign 25 is assigned to a defroster blowing unit. For example, the light source panel 10 is installed at a position on the near side (see FIG. 7) or the far side (see FIG. 8) of the defroster blowing unit 25 when seen from the eye point 30. For example, the light source panel 10 is installed on the lower side than the surface of the installment panel 22 (i.e., inside the installment panel 22). For example, the light source panel 10 is embedded in the installment panel 22.

Figure 9:
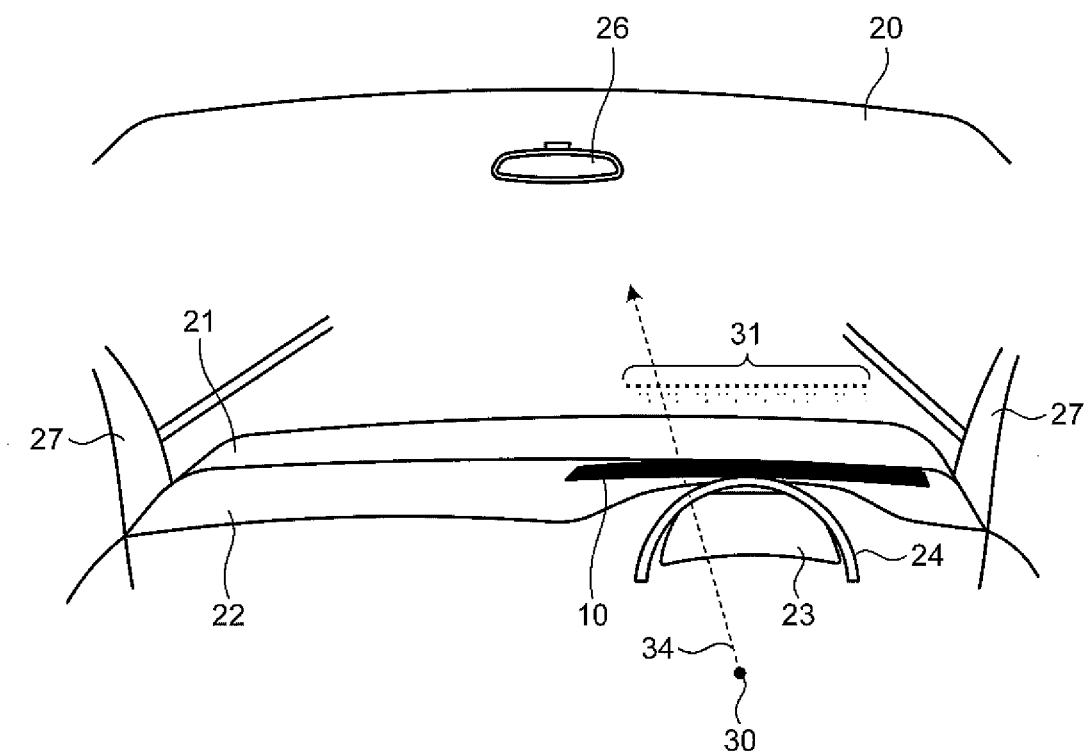
FIG. 9 is a view illustrating one example of the mounting position of the light source panel 10.

FIG. 9 is a view illustrating another example of the mounting position of the light source panel 10 in the vehicle 1. In FIG. 9, reference sign 26 is assigned to a rearview mirror, reference sign 27 to an A-pillar, and reference sign 34 to an observing direction of the driver. For example, the light source panel 10 is installed at a position substantially in front of the driver in the installment panel 22. The light source panel 10 is installed on the installment panel 22 such that the background of the virtual image 31 becomes the foreground (e.g., road, preceding vehicle, or the like), for example, when seen from the eye point 30.

Figure 10:
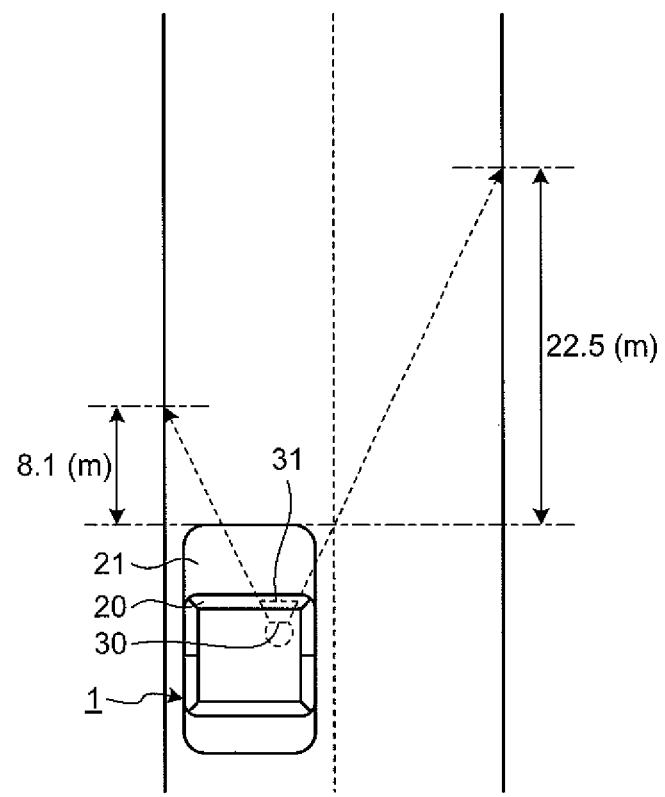
FIG. 10 is a view illustrating one example of a display range of a virtual image 31 when seen from the upper side of a vehicle 1.

FIG. 10 is a view illustrating one example of a display range of the virtual image 31 when seen from the upper side of the vehicle 1. If the vehicle 1, in which the light source panel 10 is mounted on the installment panel 22 as illustrated above, exists on the road having a sidewalk width of 1 (m) and a lane width of 3.2 (m), for example, the display range of the virtual image 31 (range of the dangerous object) when seen from the eye point 30 is the illustrated range to 8.1 (m) on the left side and 22.5 (m) on the right side.

Returning back to FIG. 1, the lighting control unit 15 generates lighting patterns (e.g., lighting content or lighting mode associated with irradiation position of light in the front window glass 20, irradiation area of light in the front window glass 20, color of light, luminance of light, period (blinking) of light, changing amount per unit change of color or luminance of light (unit changing amount of color or luminance), and the like) for regular-time, for attracting attention, or for warning, based on the vehicle exterior environment at the periphery of the vehicle 1 detected by the object sensor 11, the observing point or the observing direction of the driver detected by the driver sensor 12, the vehicle speed of the vehicle 1 detected by the vehicle speed sensor 13, the degree of danger at the periphery of the vehicle 1 calculated with the risk calculating unit 14a, and the like, and executes the lighting control (e.g., adjustment of application voltage, etc.) of the individual light source 10a so as to obtain the generated lighting patterns.

Figures 11, 12:
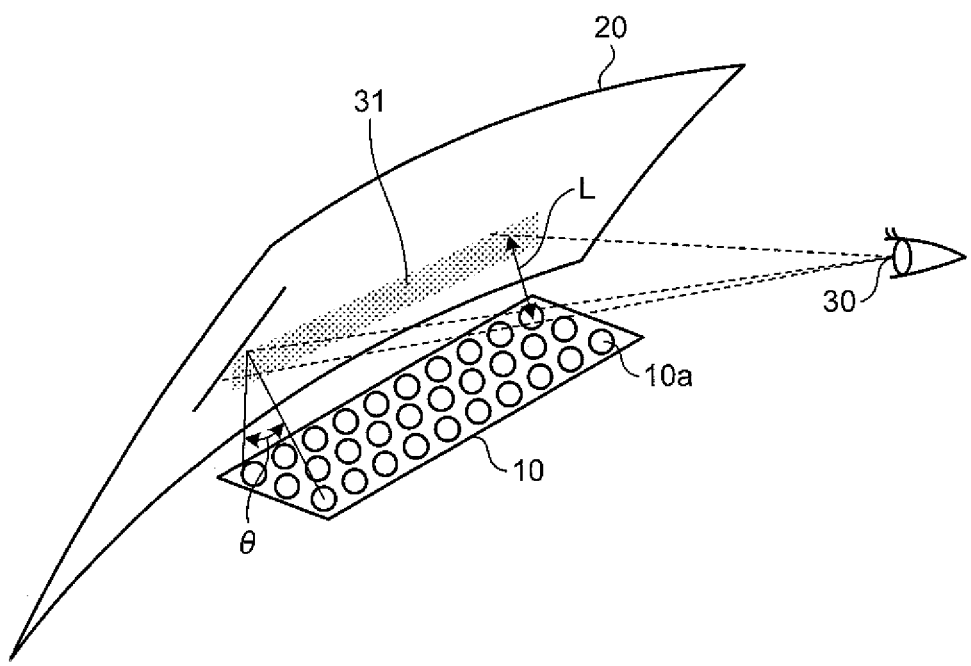

An example of a method for adjusting (calibrating) the color and the luminance of the light from the light source 10a will be described with reference to FIG. 11 to FIG. 13. As illustrated in FIG. 11, the color and the luminance of the individual light source 10a are adjusted according to the distance L and/or the angle θ in advance. For example, the color and the luminance of the individual light source 10a are adjusted based on a map (see FIG. 12) defining a relationship between the distance L and the color/luminance, and/or a map (see FIG. 12) defining a relationship between the angle θ and the color/luminance. The distance L is the distance from the light source 10a to the irradiation position of the light of the light source 10a in the front window glass 20. The angle θ is the angle formed by a line segment connecting the arrangement position of the light source 10a and the irradiation position of the light, and the front window glass 20. The color and the luminance of the individual light source 10a in the regular-time, at the time of attracting attention, and at the time of warning are adjusted in advance, for example, according to the color of the installment panel, the A-pillar, the side mirror, or the like. For example, the color and the luminance of the individual light source 10a in the regular-time, at the time of attracting attention, and at the time of warning are adjusted based on a map (see FIG. 13) defining a relationship between a vehicle body color, and the regular-time color, attention attracting color, warning color, and luminance. The state of adjustment associated with the color and the luminance is stored in a storage region of the lighting control unit 15.

The lighting control unit 15 may adjust the luminance or the color of the light by turning on/off the headlight, using Conlight sensor, or the like. For example, the lighting control unit 15 may lower the luminance of the light at nighttime. The lighting control unit 15 may adjust the luminance, the color, the cycle (blinking) of the light emission, and the like according to the magnitude of reliability of the degree of danger estimated with the risk calculating unit 14a. The lighting control unit 15 may stop the light recognized by the driver of the illuminated lights, or may reduce the luminance/color, and the like of such light based on the observing point or the observing direction of the driver detected by the driver sensor 12. The lighting control unit 15 may also notify the content (e.g., whether the dangerous object is person, vehicle, etc.) of the dangerous object in accordance with the existing position or the existing direction of the dangerous object.

Returning back to FIG. 1, the transmission control unit 16 adjusts the transmitting extent (blurring extent/diffusiveness) of the light from the light source 10a in the light source panel 10 based on the vehicle exterior environment at the periphery of the vehicle 1 detected by the object sensor 11, the observing point or the observing direction of the driver detected by the driver sensor 12, the vehicle speed of the vehicle 1 detected by the vehicle speed sensor 13, the degree of danger at the periphery of the vehicle 1 calculated by the risk calculating unit 14, the lighting pattern generated by the lighting control unit 15, and the like.

Figure 15:
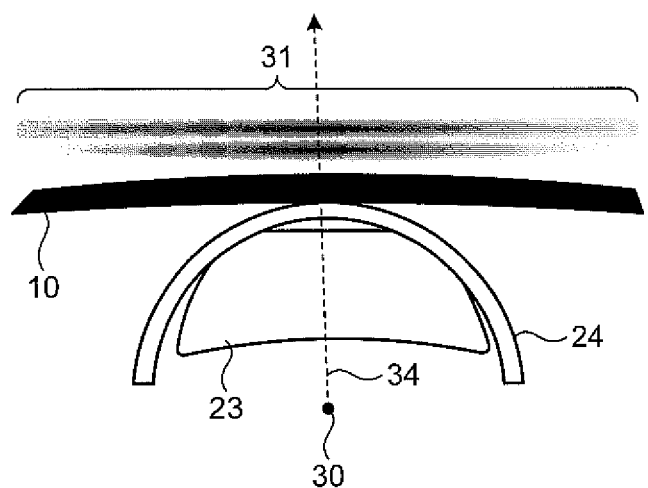
FIG. 15 is a view illustrating one example of a way of illustrating the virtual image 31.

For example, when the lighting control unit 15 lights the light source 10a in the lighting pattern for attracting attention, the transmission control unit 16 makes the distance between the light source 10a and the diffusion plate 10b long overall when the light source panel 10 illustrated in FIG. 2 is used, makes the distance between the diffusion plate 10b and the light guiding member 10e long overall when the light source panel 10 illustrated in FIG. 3 is used, and reduces the aperture ratio of the liquid crystal panel 10f overall when the light source panel 10 illustrated in FIG. 4 is used. The virtual image 31 thus can be changed from a clear state illustrated in FIG. 14, to a dim blurred state illustrated in FIG. 15. That is, the virtual image 31 can be gradated.

The transmission control unit 16 adjusts the distance between the light source 10a and the diffusion plate 10b when the light source panel 10 illustrated in FIG. 2 is used, the distance between the diffusion plate 10b and the light guiding member 10e when the light source panel 10 illustrated in FIG. 3 is used, and the aperture ratio of the liquid crystal panel 10f when the light source panel 10 illustrated in FIG. 4 is used according to the degree of danger calculated by the risk calculating unit 14a. When the degree of danger is small, the transmission control unit 16 makes the distance between the light source 10a and the diffusion plate 10b long overall, makes the distance between the diffusion plate 10b and the light guiding member 10e long overall, and reduces the aperture ratio overall. When the degree of danger is large, the transmission control unit 16 makes the distance between the light source 10a and the diffusion plate 10b short overall, makes the distance between the diffusion plate 10b and the light guiding member 10e short overall, and increases the aperture ratio overall. Thus, the virtual image 31 can appear in a clear state when the risk is high, and the virtual image 31 can appear in a dim blurred state when the risk is low.

When the lighting control unit 15 lights the light source 10a in the lighting pattern displaying specific information (e.g., character, icon, etc.), the transmission control unit 16 makes the distance between the light source 10a and the diffusion plate 10b short overall when the light source panel 10 illustrated in FIG. 2 is used, makes the distance between the diffusion plate 10b and the light guiding member 10e short overall when the light source panel 10 illustrated in FIG. 3 is used, and increases the aperture ratio of the liquid crystal panel 10f overall when the light source panel 10 illustrated in FIG. 4 is used. The virtual image 31 corresponding to the specific information thus can be made to appear in a clear state.

Figure 16:
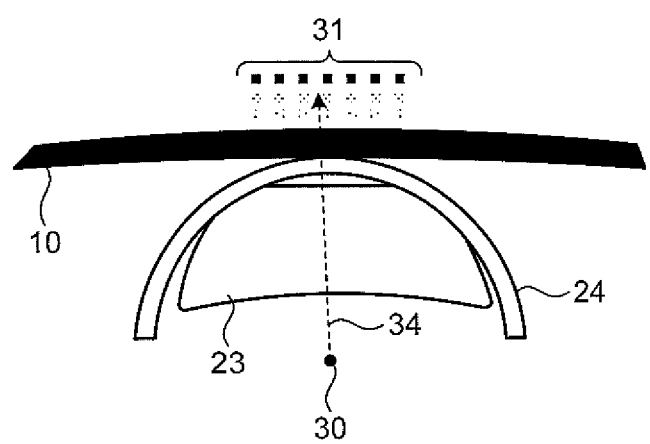
FIG. 16 is a view illustrating one example of a way of illustrating the virtual image 31.
Figure 17:
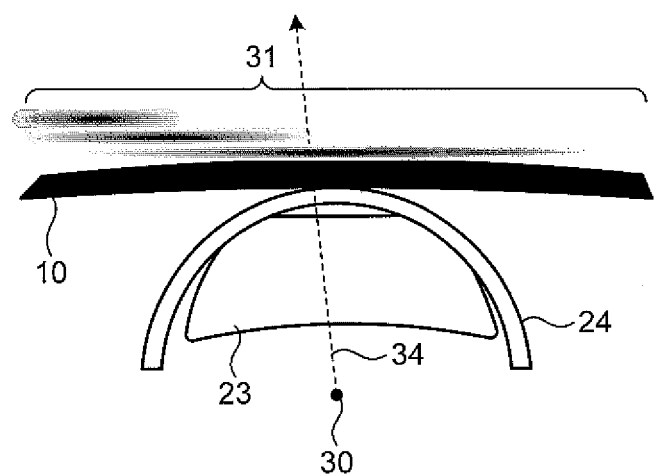
FIG. 17 is a view illustrating one example of a way of illustrating the virtual image 31.

The transmission control unit 16 adjusts the distance between the light source 10a and the diffusion plate 10b when the light source panel 10 illustrated in FIG. 2 is used, the distance between the diffusion plate 10b and the light guiding member 10e when the light source panel 10 illustrated in FIG. 3 is used, and the aperture ratio of the liquid crystal panel 10f when the light source panel 10 illustrated in FIG. 4 is used according to the vehicle speed of the vehicle 1 detected by the vehicle speed sensor 13. The transmission control unit 16 makes the distance between the light source 10a and the diffusion plate 10b short overall, makes the distance between the diffusion plate 10b and the light guiding member 10e short overall, and increases the aperture ratio overall when the vehicle speed is smaller than or equal to a predetermined value (e.g., when the vehicle 1 is stopping, etc). When the vehicle speed is greater than the predetermined value (e.g., when the vehicle 1 is travelling, etc.), the transmission control unit 16 makes the distance between the light source 10a and the diffusion plate 10b long overall, makes the distance between the diffusion plate 10b and the light guiding member 10e long overall, and reduces the aperture ratio overall. Thus, the virtual image 31 can appear in a clear state as illustrated in FIG. 16 when the vehicle 1 is stopping, and the virtual image 31 can appear in a dim blurred state as illustrated in FIG. 17 when the vehicle 1 is travelling.

Figure 18:
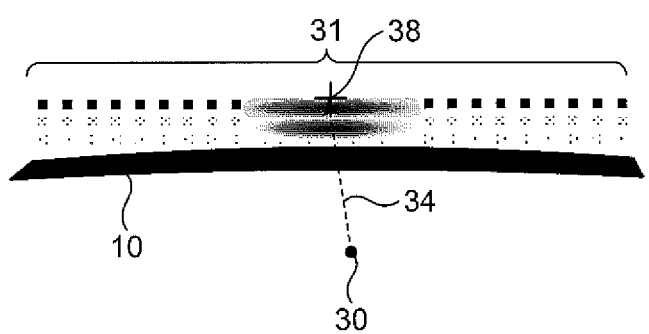
FIG. 18 is a view illustrating one example of a way of illustrating the virtual image 31.

When the light source panel 10 illustrated in FIG. 2 is used, the transmission control unit 16 makes the distance with the light source 10a partially long by a portion corresponding to the arrangement position of the light source 10a that irradiates the light to the vicinity of an observing point 38 of the driver detected by the driver sensor 12 in the diffusion plate 10b. When the light source panel 10 illustrated in FIG. 3 is used, the transmission control unit 16 makes the distance with the diffusion plate 10b partially long by the light guiding member 10e arranged in the light source 10a that irradiates the light to the vicinity of the observing point 38. When the light source panel 10 illustrated in FIG. 4 is used, the transmission control unit 16 reduces the aperture ratio by the portion corresponding to the arrangement position of the light source 10a that irradiates the light to the vicinity of the observing point 38 in the liquid crystal panel 10f. Thus, as illustrated in FIG. 18, only the portion (portion in the vicinity of the observing point 38) seen from the driver of the virtual image 31 can be selectively appeared in the dim blurred state.

Figure 19:
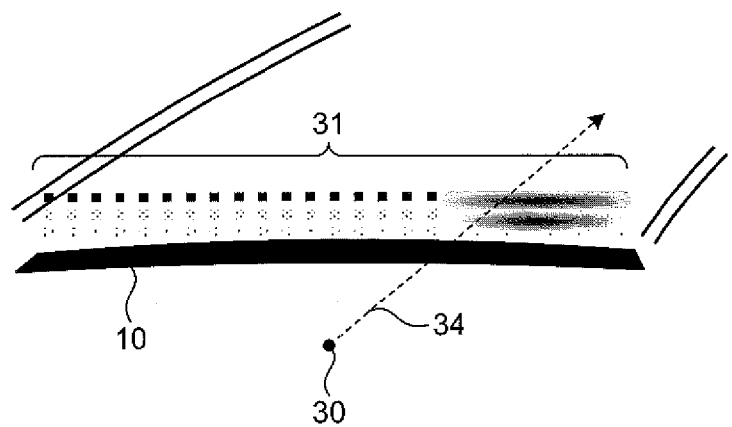
FIG. 19 is a view illustrating one example of a way of illustrating the virtual image 31.

The transmission control unit 16 also adjusts the transmitting extent of the light of the light source 10a in the light source panel 10 according to the road shape such as left curve, right curve, and the like. When the light source panel 10 illustrated in FIG. 2 is used, the transmission control unit 16 makes the distance with the light source 10a partially long by the portion corresponding to the arrangement position of the light source 10a that irradiates the light in the changing direction of the road shape (e.g., right direction for right curve, left direction for left curve) observed by the driver in the diffusion plate 10b. When the light source panel 10 illustrated in FIG. 3 is used, the transmission control unit 16 makes the distance with the diffusion plate 10b partially long by the light guiding member 10e arranged in the light source 10a that irradiates the light in the changing direction of the road shape. When the light source panel 10 illustrated in FIG. 4 is used, the transmission control unit 16 reduces the aperture ratio by the portion corresponding to the arrangement position of the light source 10a that irradiates the light in the changing direction of the road shape in the liquid crystal panel 10f. Thus, as illustrated in FIG. 19, only the portion in the curve direction observed by the driver (portion in the vicinity of the observing direction 34) of the virtual image 31 can be selectively made to appear in the dim blurred state.

Figure 20:
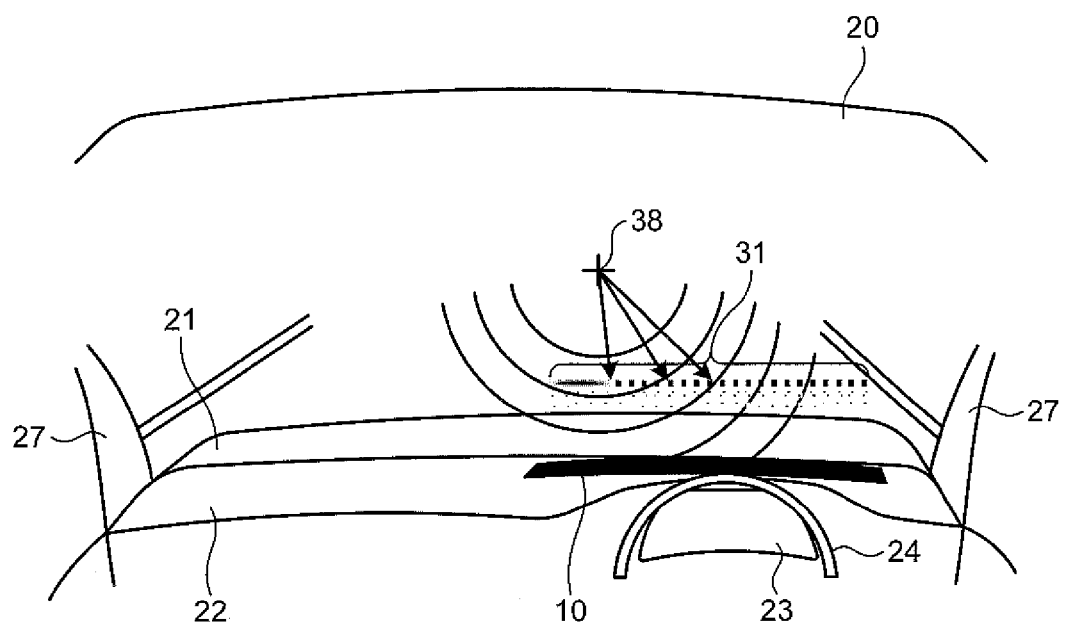
FIG. 20 is a view illustrating one example of a way of illustrating the virtual image 31.

The transmission control unit 16 also adjusts the transmitting extent of the light of the light source 10a in the light source panel 10 according to the distance from a central viewing field of the driver (observing point 38 of the driver detected by the driver sensor 12) to the virtual image 31. When the light source panel 10 illustrated in FIG. 2 is used, the transmission control unit 16 makes the distance between the light source 10a, which distance with the observing point 38 is relatively short, and the diffusion plate 10b relatively long, makes the distance with the light source 10a, which distance with the observing point 38 is relatively long, and the diffusion plate 10b relatively short, and makes the distance between the light source 10a, which distance with the observing point 38 is a relatively intermediate distance, and the diffusion plate 10b relatively intermediate. When the light source panel 10 illustrated in FIG. 3 is used, the transmission control unit 16 makes the distance between the light guiding member 10e arranged in the light source 10a, which distance with the observing point 38 is relatively short, and the diffusion plate 10b relatively long, makes the distance between the light guiding member 10e arranged in the light source 10a, which distance with the observing point 38 is relatively long, and the diffusion plate 10b relatively short, and the distance between the light guiding member 10e arranged in the light source 10a, which distance with the observing point 38 is relatively intermediate, and the diffusion plate 10b relatively intermediate. When the light source panel 10 illustrated in FIG. 4 is used, the transmission control unit 16 makes the aperture ratio of the portion of the liquid crystal panel 10f corresponding to the arrangement position of the light source 10a, which distance with the observing point 38 is relatively short, relatively small, the aperture ratio of the portion of the liquid crystal panel 10f corresponding to the arrangement position of the light source 10a, which distance with the observing point 38 is relatively long, relatively large, and the aperture ratio of the portion of the liquid crystal panel 10f corresponding to the arrangement position of the light source 10a, which distance with the observing point 38 is relatively intermediate, to a relatively intermediate size. Thus, as illustrated in FIG. 20, the virtual image 31 can be gradually changed from the dim blurred state to the clear state from the position where the distance with the observing point 38 is short towards the position where such distance is long.

[2. Operation (Part 1)]

FIG. 21 is a flowchart illustrating one example of a risk calculating operation and a lighting control operation executed with the vehicle information transmitting system according to the present embodiment.

[Step SA1: Measurement of Vehicle Exterior Environment]

The object sensor 11 measures information associated with the object (e.g., pedestrian, bicycle, automobile, blind angle, etc.) at the periphery of the vehicle 1.

[Step SA2: Recognition of Vehicle Exterior Environment]

The risk calculating unit 14a recognizes whether the state at the periphery of the vehicle 1 is a normal state in which the object does not exist and there is no need to attract attention or warn, or a state in which the object exists and there is need to attract attention or warn based on the information associated with the object measured in step SA1. For example, the risk calculating unit 14a recognizes as the normal state if the object does not exist, and recognizes as the state in which there is need to attract attention or warn if the object exists.

[Step SA3: Calculation of Dangerous Degree]

If recognized that the state at the periphery of the vehicle 1 is the state in which there is need to attract attention or warn in step SA2, the risk calculating unit 14a confirms the existing position of the object based on the information associated with the object measured in step SA1. The risk calculating unit 14a estimates that the degree of danger is small (state in which there is need to attract attention) for the object which existing position cannot be confirmed.

The risk calculating unit 14a calculates the distance between the object and the vehicle 1, and the relative deceleration (may be relative speed or relative acceleration) of the object with respect to the vehicle 1 for the object which existing position is confirmed. The risk calculating unit 14a estimates that the degree of danger is large (state in which there is need to warn) if the distance is short, and estimates that the degree of danger is small (state in which there is need to attract attention) if the distance is long. The risk calculating unit 14a estimates that the degree of danger is small (state in which there is need to attract attention) if the relative deceleration of the object with respect to the vehicle 1 is small, and estimates that the degree of danger is large (state in which there is need to warn) if the relative deceleration is large.

[Step SA4: Generation of Light Stimulation Pattern]

The lighting control unit 15 refers to a map illustrated in FIG. 22 defining the position of the object and the degree of danger, and the irradiation position and the irradiation area of the light based on the existing position of the object confirmed in step SA3 and the degree of danger of the object estimated in step SA3 to determine the irradiation position (irradiation position in the horizontal direction and the vertical (height) direction) and the irradiation area of the light for notification, and determine the irradiation position and the irradiation area of the light for allocating attention, as needed. For example, the irradiation position of the light for notification is set to the left side if the existing position of the object is on the left side, the front side if on the front side, and the right side if on the right side. The irradiation position of the light for allocating attention is set to the right side if the irradiation position of the light for notification is on the left side, the left side if on the right side, and is not set if on the front side or on both right and left sides. The irradiation area of the light for notification is set large at the time of warning in which the degree of danger of the object is large, and is set small at the time of attracting attention in which the degree of danger of the object is small. The irradiation area of the light for allocating attention is set small to an extent the difference with the irradiation area of the light for notification is clear at the time of warning in which the degree of danger of the object is large, and is set small in some measure to an extent there is barely any difference with the irradiation area of the light for notification at the time of attracting attention in which the degree of danger of the object is small.

Figures 13, 14:
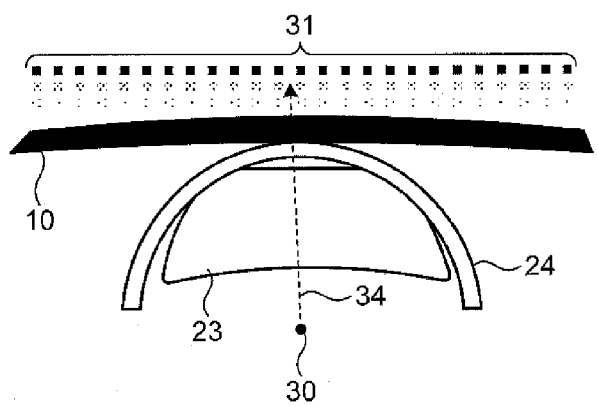
FIG. 13 is a view illustrating one example of a map defining a relationship between a vehicle body color and regular-time color, attention attracting color, warning color, and luminance.
FIG. 14 is a view illustrating one example of a way of illustrating the virtual image 31.
Figure 23:
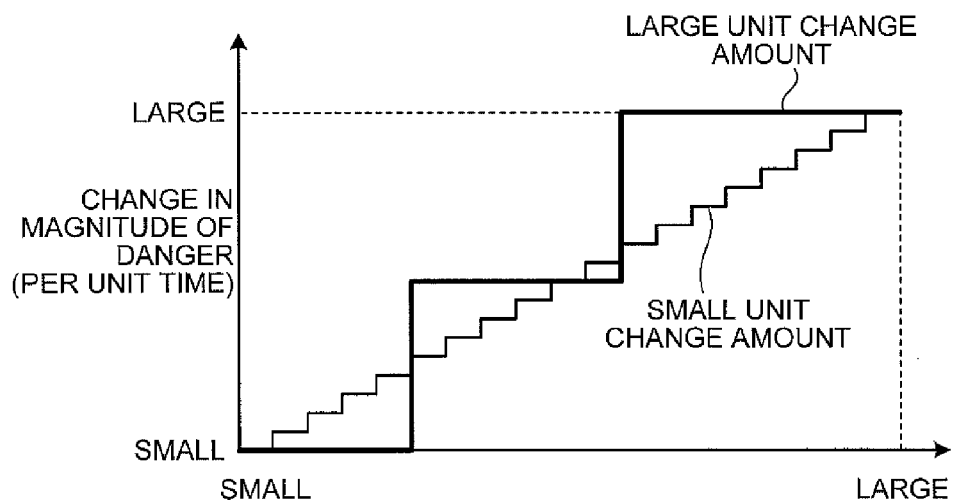
FIG. 23 is a view illustrating an example of a relationship between the degree of danger and a changing amount per unit change of the color/luminance of the light.

The lighting control unit 15 determines the color/luminance of the light for notification, and determines the color/luminance of the light for allocating attention, which is different from the color/luminance of the light for notification, as needed based on the degree of danger of the object estimated in step SA3, and the state of color/luminance adjusted and stored in advance according to the maps illustrated in FIG. 12 and FIG. 13. The lighting control unit 15 determines a changing amount per unit change (unit changing amount) of the color/luminance of the light for notification based on the degree of danger of the object estimated in step SA3. For example, as illustrated in FIG. 23, the unit changing amount of the color/luminance is set large when the change per unit time of the degree of danger is large, and the unit changing amount of the color and the luminance is set small when the change per unit time of the degree of danger is small.

The lighting control unit 15 generates the lighting pattern for notification (for attracting attention or for warning) including the irradiation position, irradiation area, color, luminance, and unit changing amount of the light determined as above. If recognized in step SA2 that the state at the periphery of the vehicle 1 is a normal state in which there is no need to attract attention, the lighting control unit 15 generates the lighting pattern for regular-time, which is different from the lighting pattern for notification, including the color and luminance of the light for regular-time based on the state of the color/luminance adjusted and stored in advance according to the maps illustrated in FIG. 12 and FIG. 13.

[Step SA5: Light Stimulation Display]

The lighting control unit 15 sets (corrects) the center position at the time of lighting in the light source panel 10 according to the road shape, and executes the lighting control of the individual light source 10a to obtain the relevant lighting pattern based on the lighting pattern for notification or for regular-time generated in step SA4 and the set center position.

Figure 24:
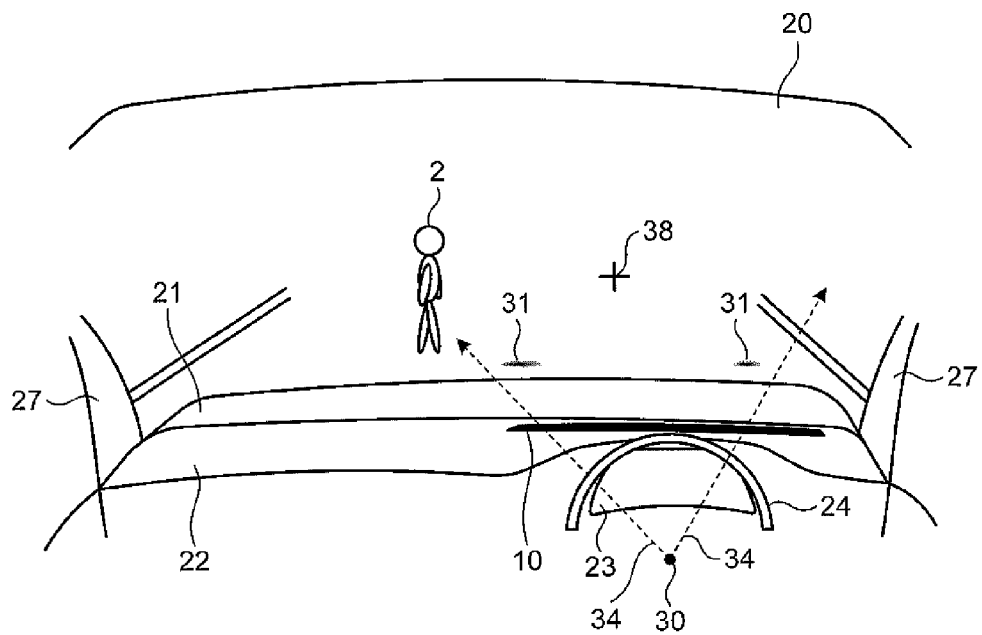
FIG. 24 is a view illustrating one example of a way of illustrating the virtual image 31.

According to the risk calculating operation and the lighting control operation described above, under a situation illustrated in FIG. 24 where warning is necessary (e.g., situation in which an object 2 with a large degree of danger exists on the left side when seen from the driver), the virtual image 31 for notification set according to the degree of danger of the object 2 appears in the left direction. A dummy virtual image 31 for allocating attention, which is set so that the total attention allocation of the driver to the periphery of the vehicle 1 is set to become constant, is also made to appear in the right direction set so that the total becomes constant. Whereby, the attention of the driver to the periphery of the vehicle 1 can be maintained uniform (uniformed) in such situation.

Figure 25:
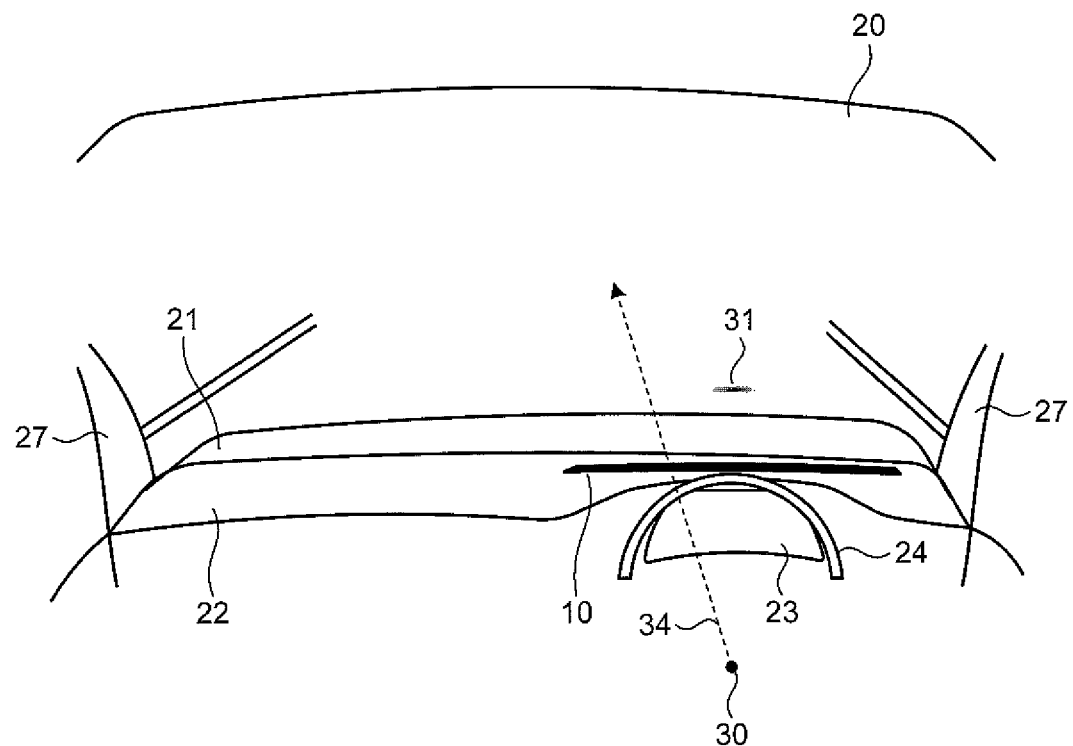
FIG. 25 is a view illustrating one example of a way of illustrating the virtual image 31.
Figure 26:
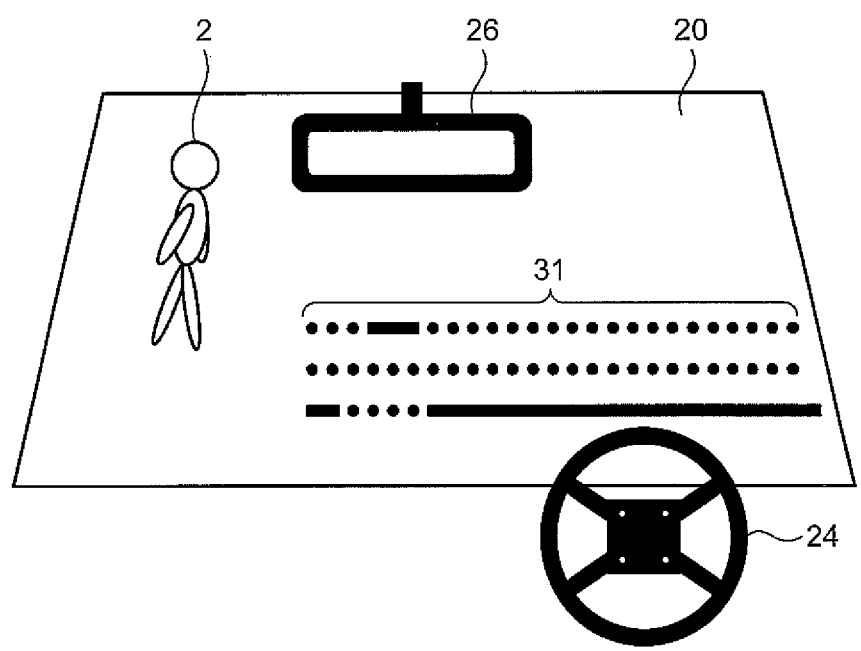
FIG. 26 is a view illustrating one example of a way of illustrating the virtual image 31.

According to the risk calculating operation and the lighting control operation described above, under a normal (safe) situation (e.g., situation in which the object does not exist at the periphery of the vehicle 1) illustrated in FIG. 25 where there is no need to attract attention or warn, the virtual image 31 for regular-time, which is different from that for notification and in which the tone is lowered, is made to appear in the left direction, center (front side) direction, right direction, or entirely when seen from the driver, for example. In a case illustrated in FIG. 26 in which the situation changes from the normal situation to the situation in which the object 2 appeared and the warning is necessary, the lighting state of the portion (lowermost layer, portion on the left side in FIG. 26) corresponding to the existing position or the existing direction of the object 2 of the green virtual image 31 for regular-time lighting at the lowermost layer is weakened, and the lighting state of the relevant portion (uppermost layer, portion on the left side in FIG. 26) of the red virtual image 31 for warning at the uppermost layer is strengthened. Thus, when the situation changes from the normal situation to the situation in which there is need to attract attention or warn, the attention attracting and the warning can be naturally prompted to the driver without a sense of discomfort and without unexpectedness.

Figure 27:
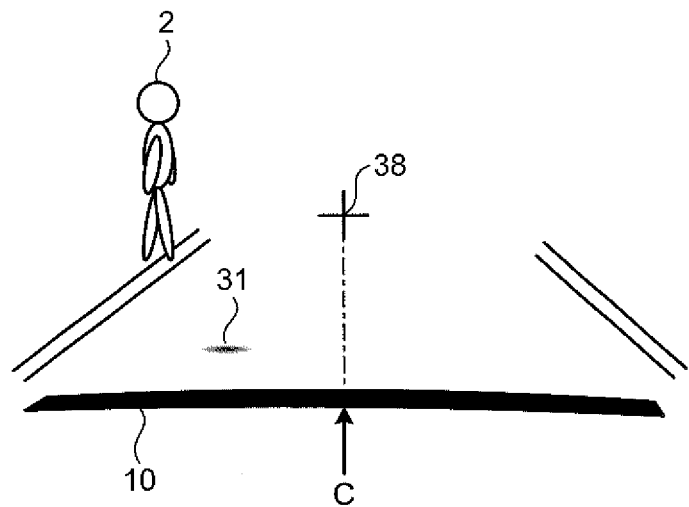
FIG. 27 is a view illustrating one example of a way of illustrating the virtual image 31.
Figure 28:
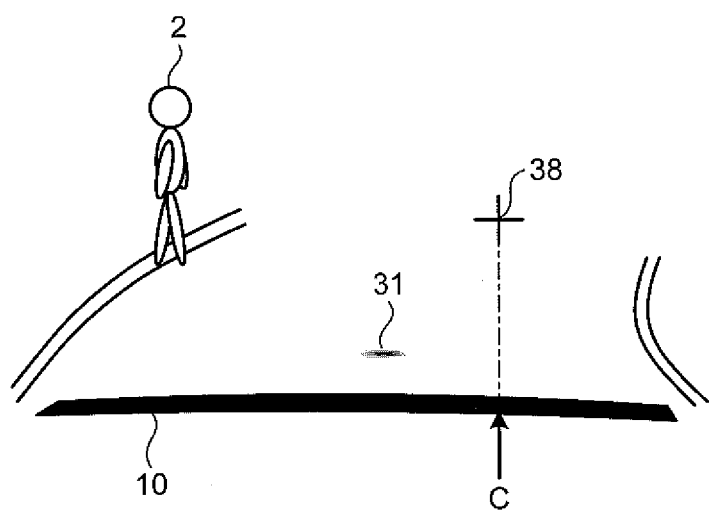
FIG. 28 is a view illustrating one example of a way of illustrating the virtual image 31.

According to the risk calculating operation and the lighting control operation described above, a center position C at the time of lighting is set (corrected) to the middle (front side) when seen from the driver in accordance with the road shape in the case illustrated in FIG. 27 in which the vehicle 1 is travelling a straight road under a situation the notification is necessary, the center position C at the time of lighting is set (corrected) to the right side when seen from the driver in accordance with the road shape in the case illustrated in FIG. 28 in which the vehicle 1 is travelling a road of right curve, and the virtual image 31 for notification is displayed based on the setting of the center position C. Thus, the attention attracting or warning can be prompted to the driver in a range not deviating from the viewing field of the driver (constant range from the observing direction of the driver).

Figure 29:
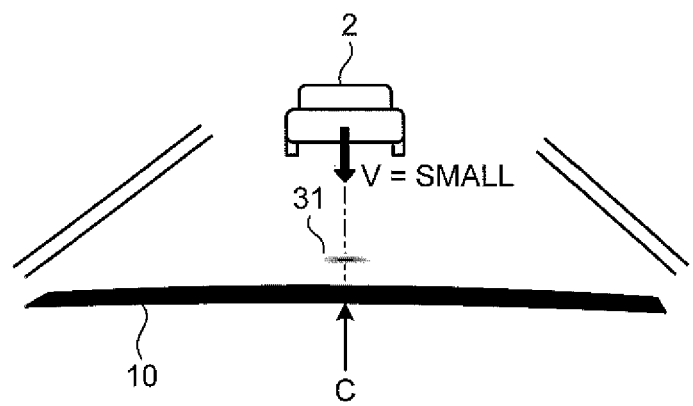
FIG. 29 is a view illustrating one example of a way of illustrating the virtual image 31.
Figure 30:
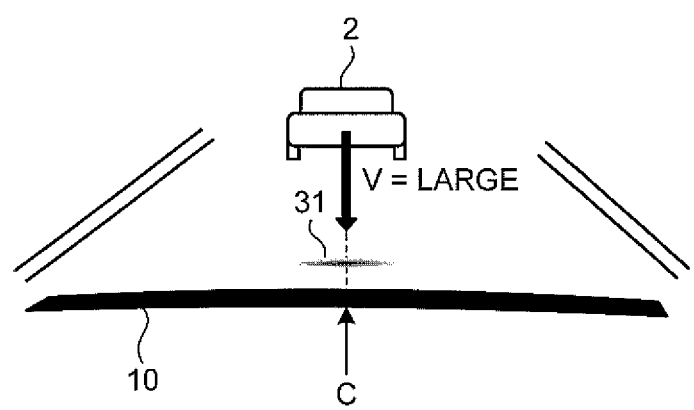
FIG. 30 is a view illustrating one example of a way of illustrating the virtual image 31.

According to the risk calculating operation and the lighting control operation described above, the virtual image 31 for attracting attention in which the unit changing amount is set small is made to appear under a situation illustrated in FIG. 29 in which the relative deceleration V of the object 2, which is a preceding vehicle, is small and attention needs to be sought, and the virtual image 31 for warning in which the unit changing amount is set large is made to appear under a situation illustrated in FIG. 30 in which a relative deceleration V of the object 2 is large and warning is necessary, and thus the attention attracting or warning can be prompted to the driver with the lighting content complying with the relative relationship of the vehicle 1 and the object.

[3. Operation (Part 2)]

Figure 31:
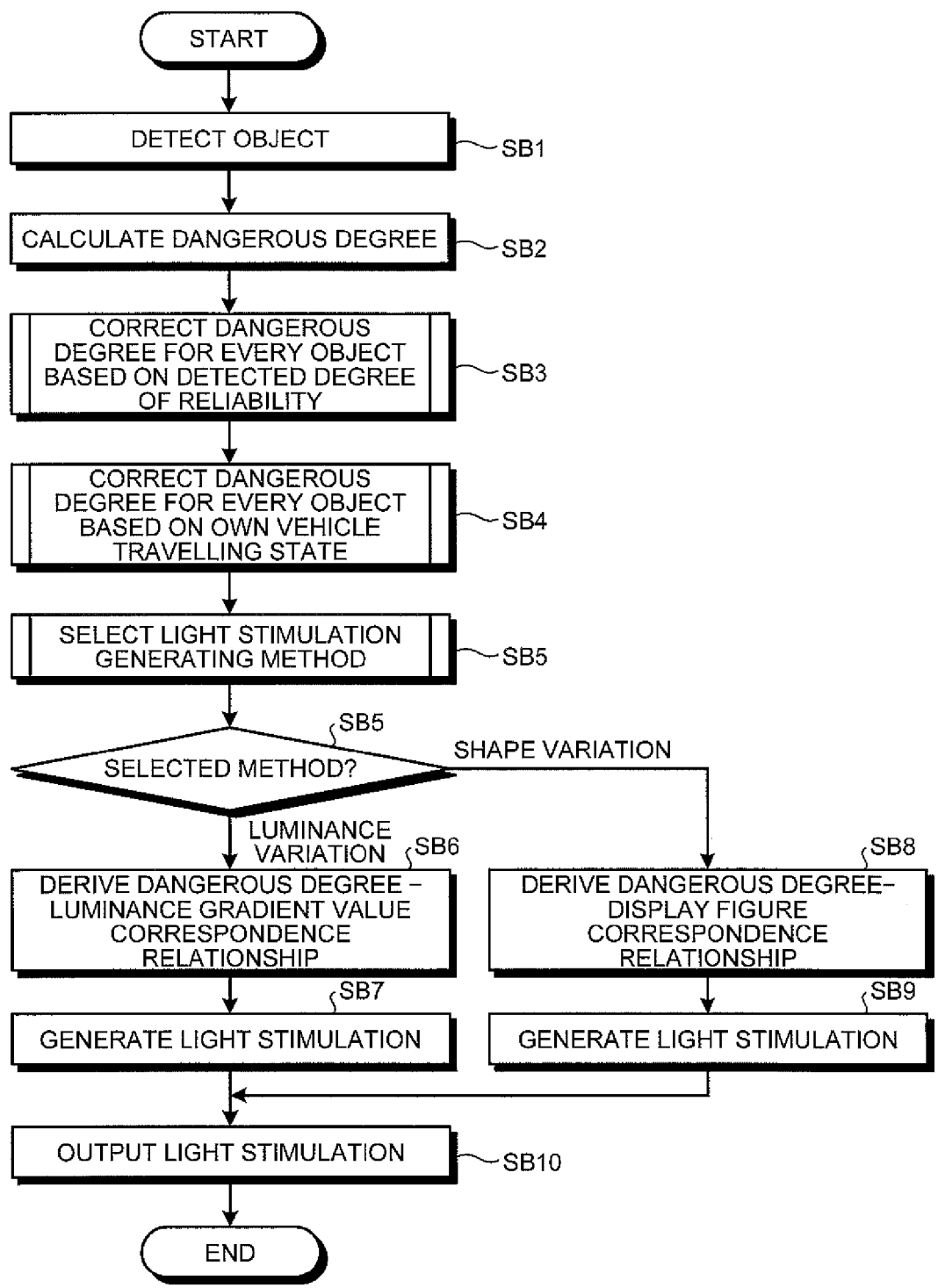
FIG. 31 is a flowchart illustrating one example of a light stimulation control operation executed by the vehicle information transmitting system according to the present embodiment.

FIG. 31 is a flowchart illustrating one example of a light stimulation control operation executed by the vehicle information transmitting system according to the present embodiment.

[Step SB1: Detection of Object]

First, the object sensor 11 detects information associated with the object (e.g., pedestrian, other vehicles, etc.) existing in the driving environment of the vehicle 1, which is the own vehicle. For example, the pedestrian, other vehicles, and the like may be detected through methods such as object recognition by a camera image, object recognition by ultrasonic wave, and the like.

[Step SB2: Calculation of Dangerous Degree]

The risk calculating unit 14a calculates the dangerous degree (e.g., extent that quantitatively indicates the "degree of danger" described above) with respect to the own vehicle of the object based on the information associated with the object detected in step SB1. For example, the dangerous degree may be calculated for every object detected in step SB1 using the calculation method described in Japanese Patent Application No. 2010-201214, which is a patent application filed by the applicant of the present invention. The dangerous degree may be a risk potential calculated with the calculation method described in Japanese Patent Application Laid-open No. 2004-362225. The "degree of danger" and the "dangerous degree" may be simply set in advance for every type of object such as "collision probability and collision possibility with the object (obstacle)", "risk potential of such object", or "small dangerous degree for vehicle, large dangerous degree for pedestrian".

[Step SB3: Correction of Dangerous Degree Based on Degree of Reliability]

The risk calculating unit 14a corrects the dangerous degree calculated in step SB2 for every object based on the detection degree of reliability (detection reliability value) for the object detected in step SB1. One example of a dangerous degree correcting operation based on the degree of reliability executed in step SB3 will be described with reference to FIG. 32, and the like.

First, the risk calculating unit 14a acquires the travelling location information associated with the travelling location of the own vehicle (e.g., general roads or express ways in the urban areas, general roads or express ways in the suburbs, general roads in the mountains, etc.) with reference to an own vehicle position database managed in the navigation system mounted on the own vehicle, for example (step SC1).

The risk calculating unit 14a then references a detection degree of reliability database illustrated in FIG. 33 stored in advance in the ECU 14, for example, to acquire the detection degree of reliability of the object exterior to the own vehicle for every object based on the travelling location information acquired in step SC1 and the information associated with the object detected in step SB1 (step SC2). The value of each detection degree of reliability in the detection degree of reliability database merely needs to be set so as to be higher the lesser the disturbance at the time of object detection, and is set so that the value of the dangerous degree after the correction becomes smaller than or equal to the value of the dangerous degree before the correction.

The risk calculating unit 14a corrects the dangerous degree calculated in step SB2 for every object based on the detection degree of reliability acquired in step SC2 (step SC3). For example, the result of multiplying the dangerous degree and the detection degree of reliability may be assumed as the dangerous degree after the correction.

[Step SB4: Correction of Dangerous Degree Based on Travelling State]

Figures 34, 35:
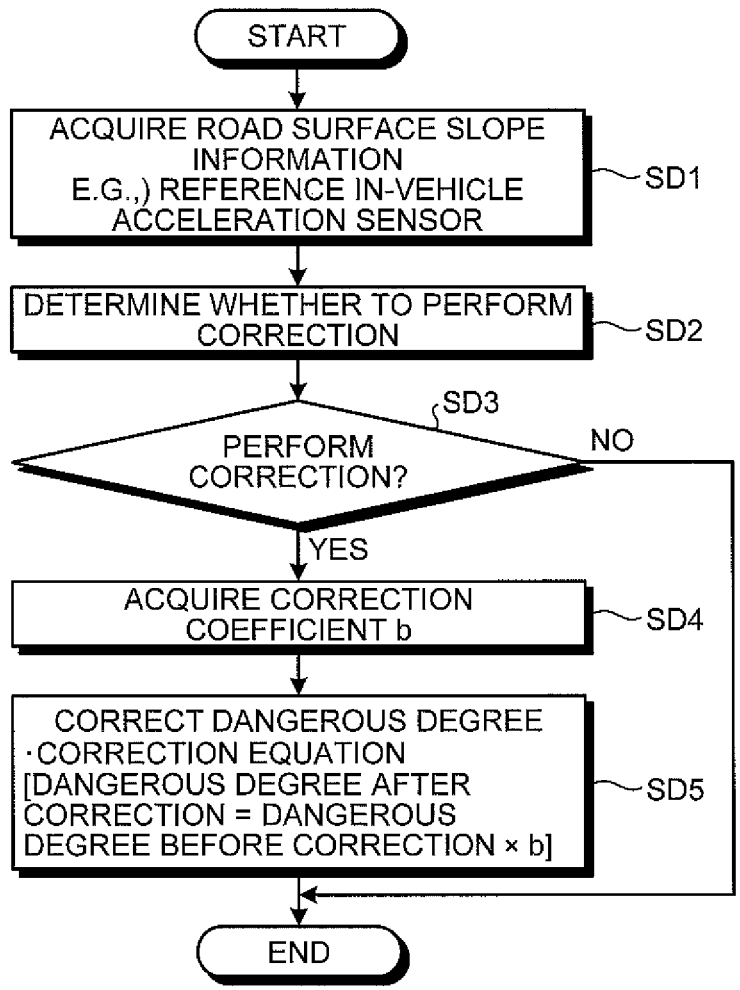
FIG. 34 is a flowchart illustrating one example of a dangerous degree correcting operation based on the travelling state executed by the vehicle information transmitting system according to the present embodiment.
FIG. 35 is a view illustrating one example of a correction coefficient database defining a relationship between a downward slope angle and a correction coefficient.

Returning back to FIG. 31, if there is a possibility the behavior of the own vehicle may become difficult to control, the risk calculating unit 14a corrects the dangerous degree after being corrected in step SB3 for every object. One example of a dangerous degree correcting operation based on the travelling state executed in step SB4 will be described with reference to FIG. 34, and the like.

First, the risk calculating unit 14a acquires road surface slope information associated with the slope of the road surface on which the own vehicle is travelling from an acceleration sensor mounted on the own vehicle, for example (step SD1).

The risk calculating unit 14a then determines whether or not to perform the correction of the dangerous degree based on the road surface slope information acquired in step SD1 (step SD2). For example, determination may be made to perform the correction if the slope of the road surface is negative, that is, in the case of downward slope. Whether or not to perform the correction may, for example, be determined based on the past accident history at the travelling location of the own vehicle. Furthermore, if the own vehicle is travelling at greater than or equal to the speed limit, for example, determination may be made to perform the correction. For example, determination may be made to perform the correction if the activation of a travel stability control device (e.g., VSC (Vehicle Stability Control), etc.) is assumed at the time of sudden braking (e.g., time of acceleration generation of ABS (Anti-lock Brake System) activation level, etc.).

When determined to perform the correction in step SD2 (step SD3: Yes), the risk calculating unit 14a references a correction coefficient database illustrated in FIG. 35 stored in advance in the ECU 14, for example, to acquire the correction coefficient corresponding to the downward slope angle specified with the road surface slope information based on the road surface slope information acquired in step SD1 (step SD4). The value of each correction coefficient in the correction coefficient database may be set so that the value of the dangerous degree after the correction becomes greater than or equal to the value of the dangerous degree before the correction.

The risk calculating unit 14a then corrects the dangerous degree after being corrected in step SB3 based on the correction coefficient acquired in step SD4 (step SD5). For example, the result of multiplying the dangerous degree and the correction coefficient may be assumed as the dangerous degree after the correction.

[Step SB5: Selection of Light Stimulation Generating Method]

Figure 36:
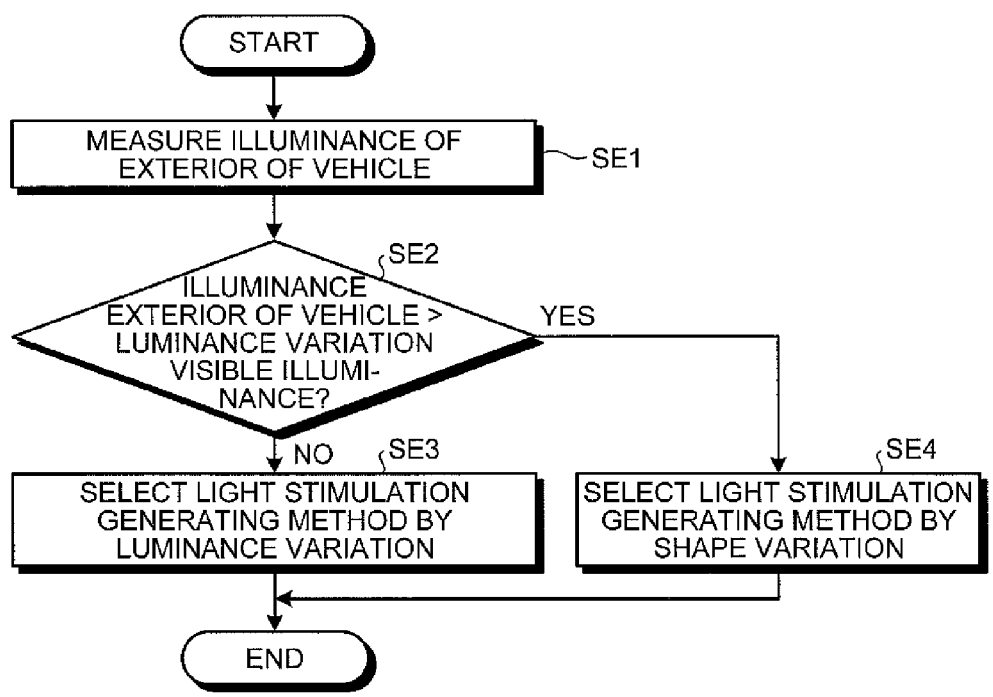
FIG. 36 is a flowchart illustrating one example of a selecting operation of a light stimulation generating method executed by the vehicle information transmitting system according to the present embodiment.

Returning back to FIG. 31, the lighting control unit 15 selects either the light stimulation generating method for changing the luminance gradient of the light stimulation according to the dangerous degree or the light stimulation generating method for changing the figure shape of the light stimulation according to the dangerous degree based on the illuminance of the exterior of the own vehicle. One example of a selecting operation of the light stimulation generating method executed in step SB5 will be described with reference to FIG. 36.

First, the lighting control unit 15 acquires the illuminance of the exterior of the own vehicle from the illuminance sensor mounted on the own vehicle, for example (step SE1).

the lighting control unit 15 selects the light stimulation generating method for changing the luminance gradient of the light stimulation according to the dangerous degree (step SE3) when the illuminance acquired in step SE1 is not greater than a luminance variation visible illuminance set in advance, which is the illuminance at which the driver can visually recognize the luminance variation, (step SE2: No), and selects the light stimulation generating method for changing the figure shape of the light stimulation according to the dangerous degree (step SE4) when the illuminance acquired in step SE1 is greater than the luminance variation visible illuminance (step SE2: Yes).

[Step SB6: Derivation of Dangerous Degree—Luminance Gradient Value Correspondence Relationship]

Returning back to FIG. 31, when the light stimulation generating method for changing the luminance gradient of the light stimulation according to the dangerous degree is selected in step SB5 (step SB5: luminance variation), the lighting control unit 15 derives the luminance gradient of the light stimulation based on the dangerous degree after being corrected in step SB3 or step SB4. One example of the method for changing the luminance gradient of the light stimulation according to the dangerous degree executed in step SB6 will be described with reference to FIG. 37.

Figure 37:
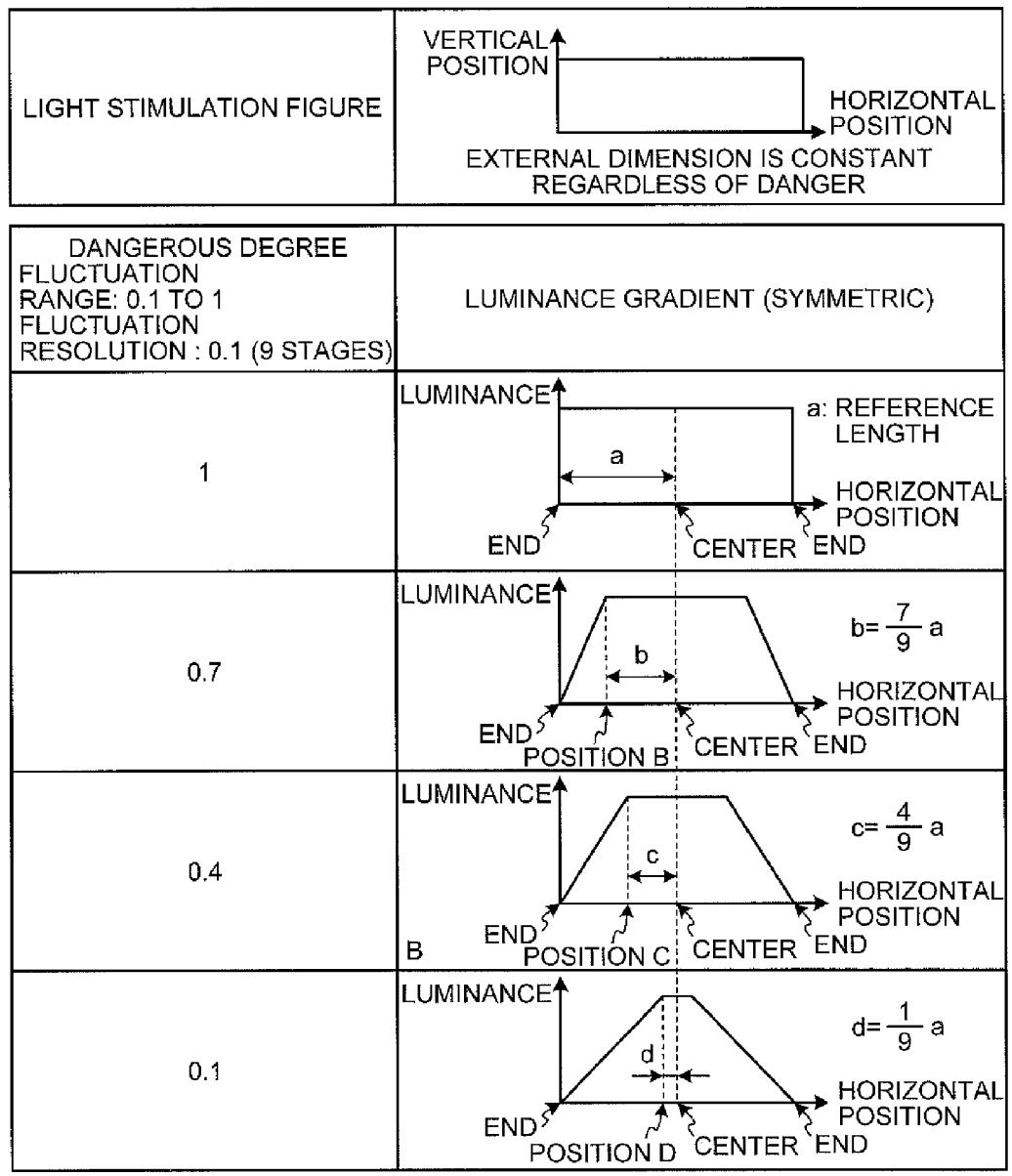
FIG. 37 is a view illustrating one example of a method for changing a luminance gradient of the light stimulation according to the dangerous degree.

As illustrated in FIG. 37, the luminance gradient is derived from a value obtained by dividing a horizontal width of the light stimulation figure that is displayed on the front window glass 20 by the light from the light source 10a based on the value of the dangerous degree. For example, when the value of the dangerous degree is one, the luminance gradient from the end to the center of the light stimulation figure is set so that the luminance is maintained at a predetermined luminance in the range of a reference length a from the end to the center. When the value of the dangerous degree is 0.7, for example, the luminance gradient from the end to the center of the light stimulation figure is set so that the luminance gradually (linearly, in a curved manner, continuously or in a step-wise manner) increases to the predetermined luminance in a range from the end to position B (position spaced apart by a length corresponding to a value b obtained with the equation "dangerous degree 0.7×10/9×reference length a" from the center), and is set so that the luminance is maintained at the predetermined luminance in the range from the position B to the center. When the value of the dangerous degree is 0.4, for example, the luminance gradient from the end to the center of the light stimulation figure is set so that the luminance gradually increases to the predetermined luminance in a range from the end to position C (position spaced apart by a length corresponding to a value c obtained with the equation "dangerous degree 0.4×10/9×reference length a" from the center), and is set so that the luminance is maintained at the predetermined luminance in the range from the position C to the center. When the value of the dangerous degree is 0.1, for example, the luminance gradient from the end to the center of the light stimulation figure is set so that the luminance gradually increases to the predetermined luminance in a range from the end to position D (position spaced apart by a length corresponding to a value d obtained with the equation "dangerous degree 0.1×10/9×reference length a" from the center), and is set so that the luminance is maintained at the predetermined luminance in the range from the position D to the center.

[Step SB7: Generation of Light Stimulation Pattern]

Returning back to FIG. 31, the lighting control unit 15 executes the operation similar to step SA4 in [2. Operation (part 1)] described above based on the information associated with the object detected in step SB1, the dangerous degree after being corrected in step SB3 or step SB4, and the like to generate the lighting pattern for notification (for attracting attention or for warning) or for regular-time.

[Step SB8: Derivation of Dangerous Degree—Display Figure Correspondence Relationship]

When the light stimulation generating method for changing the figure shape of the light stimulation according to the dangerous degree is selected in step SB5 (step SB5: shape variation), the lighting control unit 15 derives the figure shape of the light stimulation based on the dangerous degree after being corrected in step SB3 or step SB4. One example of the method for changing the figure shape of the light stimulation according to the dangerous degree executed in step SB8 will be described with reference to FIG. 38.

The figure shape of the light stimulation figure that is caused to appear on the front window glass 20 by the light from the light source 10a is derived for the left and the right based on the right and left dangerous degree distributions having the advancing direction of the own vehicle as a reference, as illustrated in FIG. 38. Specifically, the illustrated inner angle in the figure displayed on the left and the right is set in accordance with the right and left ratio of the dangerous degree distributions assuming the sum of the inner angles is 90 degrees. For example, when the right and left ratio of the dangerous degree distributions is 9:1, a FIG. A1 in which the illustrated inner angle becomes 81 (=9/10×90) degrees is set for the figure displayed on the left and a FIG. A2 in which the illustrated inner angle becomes 9 (=1/10×90) is set for the figure displayed on the right. Furthermore, for example, when the right and left ratio of the dangerous degree distributions is 7:3, a FIG. B1 in which the illustrated inner angle becomes 63 (=7/10×90) degrees is set for the figure displayed on the left and a FIG. B2 in which the illustrated inner angle becomes 27 (=3/10×90) is set for the figure displayed on the right. Moreover, for example, when the right and left ratio of the dangerous degree distributions is 5:5, FIGS. C1 and C2 in which the illustrated inner angle becomes 45 (=5/10×90) degrees are set for the figure displayed on the left and the figure displayed on the right.

[Step SB9: Generation of Light Stimulation Pattern]

Returning back to FIG. 31, the lighting control unit 15 executes the operation similar to step SA4 in [2. Operation (part 1)] described above based on the information associated with the object detected in step SB1, the dangerous degree after being corrected in step SB3 or step SB4, the figure shape of the light stimulation derived in step SB8, and the like to generate the lighting pattern for notification (for attracting attention or for warning) or for regular-time for realizing the light stimulation in the relevant figure shape.

[Step SB10: Output of Light Stimulation]

When the lighting pattern is generated in step SB7, the lighting control unit 15 executes the lighting control of the individual light source 10a so as to obtain the relevant lighting pattern, and the transmission control unit 16 adjusts the distance between the light source 10a and the diffusion plate 10b when the light source panel 10 illustrated in FIG. 2 is used, the distance between the diffusion plate 10b and the light guiding member 10e when the light source panel 10 illustrated in FIG. 3 is used, and the aperture ratio of the liquid crystal panel 10f when the light source panel 10 illustrated in FIG. 4 is used based on the luminance gradient derived in step SB6.

For example, when the light source panel 10 illustrated in FIG. 2 is used, if the luminance gradient is set to that of when the dangerous degree in FIG. 37 is smaller than one (e.g., 0.7, 0.4, 0.1, etc.), the transmission control unit 16 makes the distance with the light source 10a long in accordance with the set luminance gradient from the portion corresponding to the arrangement position of the light source 10a for irradiating the light to the center of the light stimulation figure toward the portion corresponding to the arrangement position of the light source 10a for irradiating the light to the end of the light stimulation figure in the diffusion plate 10b. Furthermore, for example, when the light source panel 10 illustrated in FIG. 3 is used, if the luminance gradient is set to that of when the dangerous degree in FIG. 37 is smaller than one (e.g., 0.7, 0.4, 0.1, etc.), the transmission control unit 16 makes the distance with the diffusion plate 10b long in accordance with the set luminance gradient from the light guiding member 10e arranged in the light source 10a for irradiating the light to the center of the light stimulation figure toward the light guiding member 10e arranged in the light source 10a for irradiating the light to the end of the light stimulation figure. Moreover, for example, when the light source panel 10 illustrated in FIG. 4 is used, if the luminance gradient is set to that of when the dangerous degree in FIG. 37 is smaller than one (e.g., 0.7, 0.4, 0.1, etc.), the transmission control unit 16 reduces the aperture ratio in accordance with the set luminance gradient from the portion corresponding to the arrangement position of the light source 10a for irradiating the light to the center of the light stimulation figure toward the portion corresponding to the arrangement position of the light source 10a for irradiating the light to the end of the light stimulation figure in the liquid crystal panel 10f.

When the lighting pattern is generated in step SB9, the lighting control unit 15 executes the lighting control of the individual light source 10a so as to obtain the relevant lighting pattern (specifically, figure shape of the light stimulation derived in step SB8).

According to the light stimulation control operation described above, the luminance gradient of the light stimulation is changed according to the dangerous degree at the exterior of the vehicle. For example, even for the display figures having the same external dimension, the emphasis of the contour of the display figure can be controlled and the noticeability at the time of visual recognition can be changed by changing the luminance gradient from the end to the center of the display figure. The danger at the exterior of the vehicle thus can be transmitted to the driver without giving a sense of bothersome.

According to the light stimulation control operation described above, the figure shape of the light stimulation is changed according to the dangerous degree at the exterior of the vehicle. For example, the process of making the rising angle of the right and left sides steep is performed on the display figures of high dangerous degree among the horizontally lined display figures to improve the awareness (noticeability) of the display. The danger at the exterior of the vehicle thus can be transmitted to the driver without giving a sense of bothersome.

According to the light stimulation control operation described above, either the method for changing the luminance gradient of the light stimulation or the method for changing the figure shape of the light stimulation is selected according to the vehicle exterior illuminance so that the danger at the exterior of the vehicle can be communicated to the driver who is notified regardless of the driving situation. The method for changing the luminance gradient of the light stimulation is effective as a method for blurring the contour of the light stimulation figure, but the light stimulation figure becomes hard to be seen by the driver under a situation where dazzling occurs at the eyes of the driver due to direct light, light from the headlight of the opposing vehicle, and the like. The method for changing the figure shape of the light stimulation is advantageous in responding to a situation where dazzling occurs compared to the method for changing the luminance gradient of the light stimulation, but the light stimulation figure tends to bother the driver since the contour of the light stimulation figure is definite. According to the light stimulation control operation described above, either the method for changing the luminance gradient of the light stimulation or the method for changing the figure shape of the light stimulation is selected according to the vehicle exterior illuminance so that the danger in the travelling environment can be stably transmitted to the driver regardless of the brightness of the environment.

According to the light stimulation control operation described above, the calculation of calculating the detection reliability value of each dangerous object at the exterior of the vehicle from the travelling condition and changing the estimated value of the danger is performed, so that the driver will not feel insecure since an excessively large sense of danger is transmitted when the reliability is low and hence smooth driving performance is achieved.

Furthermore, according to the light stimulation control operation described above, the possibility of being in a state where the behavior of the own vehicle is difficult to be controlled (e.g., possibility of not being able to decelerate immediately, etc.) is determined and the calculation of changing the estimated value of danger is carried out when there is a possibility, and thus the dangerous degree is displayed in the enhanced manner in the own vehicle situation where the handling performance on the danger is difficult to be taken so that the driver can have more room to cope with danger.

[4. Conclusion of Present Embodiment]

According to the present embodiment, the attention attracting or warning is prompted to the driver by irradiating the light of a plurality of light sources 10a arranged in an array form (plural rows or plural columns) in the light source panel 10 mounted at a predetermined position of the installment panel 22 with the color, luminance, area, period, and the like corresponding to the degree of danger, and the like of the dangerous object to the portion of the front window glass 20 corresponding to the existing position or the existing direction of the dangerous object (e.g., pedestrian, bicycle, automobile, blind angle, etc.). In the conventional night view system, for example, when a human is detected by an infrared sensor at night, this is notified with the detected human surrounded with a frame, but the correspondence relationship of the content displayed in the screen and the actual situation is difficult for the driver to understand. However, according to the present embodiment, having the position or direction of the dangerous object to be easily and reliably noticed by (notified to) the driver, and notifying so as not to be bothersome and not to provide discomfort to the driver can both be achieved.

According to the present embodiment, the luminance (application voltage) and the color of the light of each light source 10a are set according to the distance from the arrangement position of the light source 10a to the irradiation position of the light from the light source 10a in the front window glass 20 and/or the angle formed by the line segment connecting the arrangement position and the irradiation position and the front window glass 20. For example, the luminance of the light is set larger for the light source 10a in which distance with the irradiation position is longer. Thus, the light reflected by the vehicle body is more easily visually recognized by the driver, and consequently, the transmission efficiency of the information can be enhanced. The light can be focused on a position that is easy to be seen in accordance with the eye point of the driver.

According to the present embodiment, the light source panel 10 includes a mechanism for adjusting the luminance of the light of the light source 10a (transmitting extent or blurring extent (blurring degree) of light). Thus, bothersome that occurs when the light is strong can be resolved. For example, the luminance of the light is lowered to blur the virtual image when prompting the driver to confirm a certain position or direction, and the luminance of the light is raised to clearly show the virtual image when transmitting specific information such as character, icon. Thus, it becomes difficult for the driver to focus on the virtual image, and the foreground becomes easier to be seen. In the case of transmitting the specific information, the luminance of the light is lowered to blur the virtual image when the vehicle 1 is travelling at a speed exceeding a predetermined speed. Thus, the visual performance by central vision is induced to present detailed information while parking, and the visual performance by peripheral vision is induced to transmit only the existence and the position of danger during travelling. That is, the amount and quality of the transmitted information can be enhanced during parking, and the amount and quality of the transmitted information can be suppressed during travelling. The luminance of the light is selectively lowered only for the light source 10a corresponding to the irradiation position of the light recognized by the driver to partially blur the virtual image. Thus, it becomes difficult for the driver to focus on the virtual image that the driver once saw, and the viewpoint retaining time by direct vision can be reduced. The luminance of the light is raised the higher the quality and the priority of the transmitted information, for example, the higher the degree of danger at the periphery of the vehicle 1 to clearly show the virtual image. The important information thus can be reliably transmitted to the driver. The viewing direction to which the driver needs to pay attention the most is estimated from the road shape (curve), and the luminance of the light irradiated in such direction is lowered to blur the virtual image. Thus, during the curve travelling, it becomes difficult to focus on the virtual image in the observing direction, and the foreground becomes easier to be seen. The luminance of the light is adjusted to change the blurring degree of the virtual image according to the farness and closeness from the center view. Thus, the amount and quality of the transmitted information can be made appropriate in view of the human property in which a more definite shape is easily captured when closer to the center vision. Furthermore, the luminance of the light is adjusted according to the distance from the peripheral edge portion to the center portion of the light based on the dangerous degree. Specifically, the luminance gradient (changing amount) from the peripheral edge portion to the center portion of the light when the dangerous degree is high is made greater than the luminance gradient from the peripheral edge portion to the center portion of the light when the dangerous degree is low. The information of high dangerous degree thus can be more clearly displayed.

According to the present embodiment, when notifying the existing position or the existing direction of the object, the virtual image for notification corresponding to the degree of danger, and the like of the object appears in the existing position or the existing direction, and the virtual image for attention allocation different from the virtual image for notification is also displayed in the position or the direction different from the existing position or the existing direction. For example, when the dangerous object is on the left side or the right side, the allocation of the lighting content is modified (changed) according to the degree of danger. Thus, the attention allocation of the driver to the periphery of the vehicle 1 can be maintained to the same extent as the regular-time while appropriately prompting the driver to confirm the object. Each lighting state can be changed according to the content of each danger at the time of plural simultaneous lighting. The recognition is prompted to the driver not integrally but with respect to each discontinuously discrete position. Thus, the attention allocation can be suitably carried out to the area to be recognized while prompting the recognition of a wide range. When notifying the information of high urgency, the virtual image for notification corresponding to such information may be displayed or appear temporally faster than the virtual image for attention allocation.

According to the present embodiment, the light source 10a on the left side, the middle, or the right side on the front side of the vehicle is regular-time lighted with the lighting content for regular-time even in the normal state. Thus, when changed to the notifying state from the normal state, the attention attracting or warning can be prompted to the driver without giving a sense of discomfort and without the light standing out in excess.

According to the present embodiment, the step-wise roughness of the change in the color/luminance of the light is changed according to the change in the degree of danger at the periphery of the vehicle 1. For example, the light in which the changing amount of the luminance and/or color per unit change is large, that is, in which the change is rough is irradiated when the change in the degree of danger at the periphery of the vehicle 1 is large, and the light in which the changing amount of the luminance and/or color per unit change is small, that is, in which the change is fine is irradiated when the change in the degree of danger is small. That is, the changing amount of the luminance and/or color of the light is changed according to the relative relationship with danger. Thus, the change in the degree of danger can be clearly transmitted to the driver by changing the way of feeling danger. The step-wise roughness of the change in the color/luminance of the light is changed according to the priority of the transmitted information. For example, the light in which the changing amount of the luminance and/or color per unit change is large, that is, in which the change is rough is irradiated when transmitting the information of high priority, and the light in which the changing amount of the luminance and/or color per unit change is small, that is, in which the change is fine is irradiated when transmitting the information of low priority. Thus, the importance of the information can be clearly transmitted to the driver.

INDUSTRIAL APPLICABILITY

Therefore, the vehicle information transmitting device according to the present invention is useful in an automobile manufacturing industry, and in particular, suited to transmitting information to a driver using a vehicle body.

REFERENCE SIGNS LIST

10 LIGHT SOURCE PANEL
10a LIGHT SOURCE
10b DIFFUSION PLATE
10c SHAFT MEMBER
10d SPRING
11 OBJECT SENSOR
12 DRIVER SENSOR
13 VEHICLE SPEED SENSOR
14 ECU
14a RISK CALCULATING UNIT
15 LIGHTING CONTROL UNIT
16 TRANSMISSION CONTROL UNIT
20 FRONT WINDOW GLASS
22 INSTALLMENT PANEL
31 VIRTUAL IMAGE

The invention claimed is:

1. A vehicle information transmitting device that transmits information by irradiating light to provide a light stimulation figure on a vehicle body, the vehicle information transmitting device comprising:

an adjusting unit that is configured to adjust diffusiveness of the light by changing a luminance gradient within the light stimulation figure from a peripheral edge portion to a center portion of the light thereby providing at the same time differing levels of luminance from the peripheral edge portion to the center position of the light.

2. The vehicle information transmitting device according to claim 1, wherein
the adjusting unit adjusts diffusiveness of the light by changing a luminance gradient from a peripheral edge portion to a center portion of the light based on at least one of a vehicle speed, a road shape and a dangerous degree.

3. The vehicle information transmitting device according to claim 2, wherein
the adjusting unit adjusts diffusiveness of the light according to a distance from a peripheral edge portion to the center portion of the light based on the dangerous degree.

4. The vehicle information transmitting device according to claim 1, wherein
the adjusting unit strengthens the diffusiveness when prompting to confirm a certain position or direction, and weakens the diffusiveness when transmitting specific information.

5. The vehicle information transmitting device according to claim 4, wherein
the adjusting unit adjusts the diffusiveness according to a vehicle speed when transmitting the specific information.

6. The vehicle information transmitting device according to claim 1, wherein
the adjusting unit adjusts the diffusiveness based on a dangerous degree.

7. The vehicle information transmitting device according to claim 1, wherein
the adjusting unit makes a changing amount of the luminance from the peripheral edge portion to the center portion of the light when the dangerous degree is high to be greater than the changing amount of the luminance from the peripheral edge portion to the center portion of the light when the dangerous degree is low.

8. The vehicle information transmitting device according to claim 1, wherein
the adjusting unit adjusts diffusiveness of the light by adjusting a distance between a light source or a light guiding member arranged with respect to the light source and a diffusion plate for adjusting diffusiveness of the light.

9. The vehicle information transmitting device according to claim 2, wherein
the adjusting unit adjusts diffusiveness of the light by adjusting a distance between a light source or a light guiding member arranged with respect to the light source and a diffusion plate for adjusting diffusiveness of the light.

10. The vehicle information transmitting device according to claim 3, wherein
the adjusting unit adjusts diffusiveness of the light by adjusting a distance between a light source or a light guiding member arranged with respect to the light source and a diffusion plate for adjusting diffusiveness of the light.

11. The vehicle information transmitting device according to claim 4, wherein
the adjusting unit adjusts diffusiveness of the light by adjusting a distance between a light source or a light guiding member arranged with respect to the light source and a diffusion plate for adjusting diffusiveness of the light.

12. The vehicle information transmitting device according to claim 5, wherein
the adjusting unit adjusts diffusiveness of the light by adjusting a distance between a light source or a light guiding member arranged with respect to the light source and a diffusion plate for adjusting diffusiveness of the light.

13. The vehicle information transmitting device according to claim 6, wherein
the adjusting unit adjusts diffusiveness of the light by adjusting a distance between a light source or a light guiding member arranged with respect to the light source and a diffusion plate for adjusting diffusiveness of the light.

14. The vehicle information transmitting device according to claim 7, wherein
the adjusting unit adjusts diffusiveness of the light by adjusting a distance between a light source or a light guiding member arranged with respect to the light source and a diffusion plate for adjusting diffusiveness of the light.

* * * * *